United States Patent
Oyama et al.

(10) Patent No.: US 12,485,929 B2
(45) Date of Patent: Dec. 2, 2025

(54) SURROUNDING SPACE DATA PROVIDING SYSTEM FOR CONTROL APPARATUS FOR VEHICLE

(71) Applicant: SUBARU CORPORATION, Tokyo (JP)

(72) Inventors: Hajime Oyama, Tokyo (JP); Ryosuke Namba, Tokyo (JP); Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 860 days.

(21) Appl. No.: 17/502,756

(22) Filed: Oct. 15, 2021

(65) Prior Publication Data

US 2022/0119013 A1    Apr. 21, 2022

(30) Foreign Application Priority Data

Oct. 21, 2020   (JP) ................................. 2020-176797

(51) Int. Cl.
*B60W 60/00* (2020.01)
*G06V 20/56* (2022.01)

(52) U.S. Cl.
CPC ......... *B60W 60/0027* (2020.02); *G06V 20/56* (2022.01); *B60W 2420/403* (2013.01); *B60W 2554/404* (2020.02)

(58) Field of Classification Search
None
See application file for complete search history.

(56) References Cited

U.S. PATENT DOCUMENTS

| | | | |
|---|---|---|---|
| 11,543,263 B1* | 1/2023 | Bosse | G05D 1/027 |
| 2015/0105907 A1* | 4/2015 | Aiso | B25J 9/1633 |
| | | | 901/47 |
| 2020/0033155 A1* | 1/2020 | Appelman | G01C 21/3848 |
| 2021/0403037 A1* | 12/2021 | Horigome | G06V 20/56 |
| 2022/0237920 A1* | 7/2022 | Hamano | G06V 10/25 |
| 2022/0254165 A1* | 8/2022 | Yokota | G06V 10/62 |

FOREIGN PATENT DOCUMENTS

JP    2012-256192 A    12/2012

* cited by examiner

*Primary Examiner* — Hitesh Patel
*Assistant Examiner* — Wenyuan Yang
(74) *Attorney, Agent, or Firm* — Rimon P.C.

(57) ABSTRACT

A surrounding space data providing system for a control apparatus for a vehicle includes a space generation processor and a signal generation processor. The space generation processor generates a surrounding space around the vehicle with the vehicle assuming a post-control position and a post-control posture, on the basis of a motion of the vehicle based on control data to be outputted by the control apparatus. The signal generation processor generates a generated signal of a space in which an object present in the surrounding space is arranged in the surrounding space in corresponding relation to the post-control position and the post-control posture of the vehicle. The generated signal is as suppliable to the control apparatus as a detection signal to be obtained by detection by an autonomous sensor provided in the vehicle. The signal generation processor outputs the generated signal to the control apparatus in place of the detection signal.

16 Claims, 11 Drawing Sheets

SURROUNDING SPACE DATA PROVIDING SYSTEM FOR CONTROL APPARATUS FOR VEHICLE

CROSS-REFERENCE TO RELATED APPLICATIONS

This application claims priority from Japanese Patent Application No. 2020-176797 filed on Oct. 21, 2020, the entire contents of which are hereby incorporated by reference.

BACKGROUND

The technology relates to a surrounding space data providing system for a control apparatus for a vehicle.

Vehicles such as automobiles are expected not only to control their travel in accordance with occupants' driving operations but also to be able to provide driving assistance with the occupants' driving operations or travel by automated driving without the occupants' driving operations.

SUMMARY

An aspect of the technology provides a surrounding space data providing system for a control apparatus for a vehicle. The control apparatus is configured to be supplied with a detection signal of an autonomous sensor provided in the vehicle. The control apparatus is configured to provide autonomous driving assistance, a travel control by automated driving, or both, on the basis of the detection signal of the autonomous sensor. The surrounding space data providing system includes a space generation processor and a signal generation processor. The space generation processor is configured to generate a surrounding space around the vehicle with the vehicle assuming a post-control position and a post-control posture, on the basis of a motion of the vehicle based on control data to be outputted by the control apparatus. The signal generation processor is configured to generate a generated signal of a space in which an object present in the surrounding space, a moving object in the surrounding space, or both are arranged in the surrounding space in corresponding relation to the post-control position and the post-control posture of the vehicle. The generated signal is as suppliable to the control apparatus as the detection signal to be obtained by detection by the autonomous sensor provided in the vehicle. The signal generation processor is configured to output the generated signal to the control apparatus in place of the detection signal of the autonomous sensor provided in the vehicle.

An aspect of the technology provides a surrounding space data providing system for a control apparatus for a vehicle. The control apparatus is configured to be supplied with a detection signal of an autonomous sensor provided in the vehicle. The control apparatus is configured to provide autonomous driving assistance, a travel control by automated driving, or both, on the basis of the detection signal of the autonomous sensor. The surrounding space data providing system includes circuitry. The circuitry is configured to generate a surrounding space around the vehicle with the vehicle assuming a post-control position and a post-control posture, on the basis of a motion of the vehicle based on control data to be outputted by the control apparatus. The circuitry is configured to generate a generated signal of a space in which an object present in the surrounding space, a moving object in the surrounding space, or both are arranged in the surrounding space in corresponding relation to the post-control position and the post-control posture of the vehicle. The generated signal is as suppliable to the control apparatus as the detection signal to be obtained by detection by the autonomous sensor provided in the vehicle. The circuitry is configured to output the generated signal to the control apparatus in place of the detection signal of the autonomous sensor provided in the vehicle.

DETAILED DESCRIPTION

Figure 1:
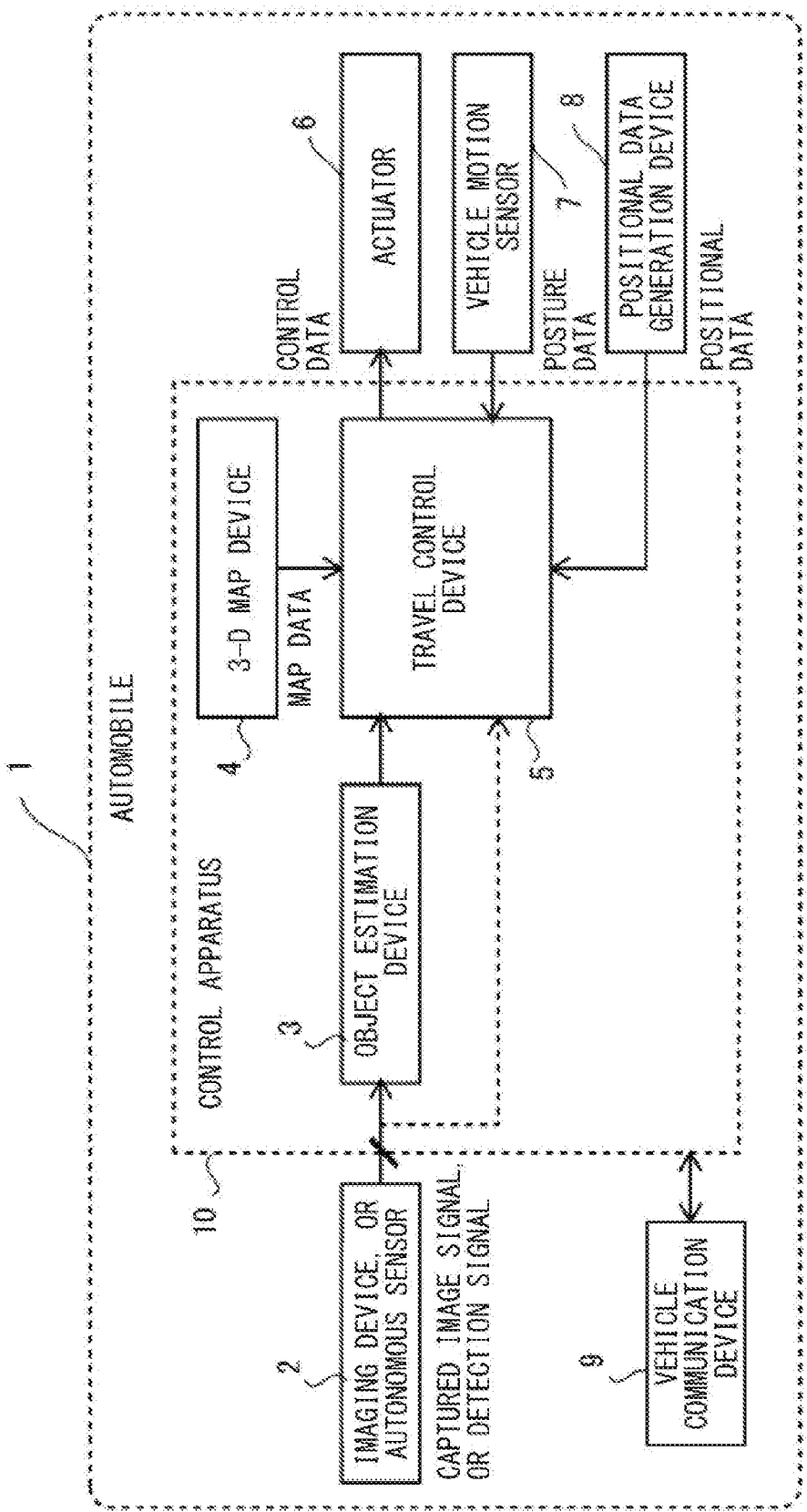
FIG. 1 is an explanatory diagram of a control system of an automobile configured to provide autonomous driving assistance or automated driving.

Developments of automobiles configured to provide driving assistance or automated driving are currently underway by allowing such an automobile to actually travel in closed areas for automobile testing, or in areas where travel by driving assistance or automated driving is exceptionally permitted within open regions where ordinary automobiles are traveling.

However, areas are limited in which travel by driving assistance or automated driving is permitted. Moreover, carrying out driving tests sometimes involves imposing restrictions on traffic of other automobiles in open regions. Even if such driving tests contributes to developments of automobiles configured to provide driving assistance or automated driving, this does not ensure that the driving assistance or the automated driving has optimal reliability and safety in areas where ordinary automobiles are traveling without any restrictions. Tests in deliberately restricted areas may be possibly insufficient in terms of contents of tests. Furthermore, a single driving test involves a lot of personnel and time. Such loads may cause an increase in development costs for vehicles configured to provide driving assistance or automated driving, resulting in potential hindrance to early spread of vehicles configured to provide driving assistance or automated driving.

A possible plan may be, for example, to carry out a driving test of a control apparatus for an automobile configured to provide driving assistance or automated driving, with the use of a simulation system of a virtual space to be traveled vertically by vehicles. Representing realistic travel environment in the virtual space in the simulation system is expected to enhance reliability and safety regarding driving assistance or automated driving to be provided by a control apparatus for an automobile.

For example, Japanese Unexamined Patent Application Publication (JP-A) No. 2012-256192 discloses a simulation system that sets, in a virtual space, travel environment in which a plurality of automobiles move. The simulation system simulates travel of an automobile in the travel environment.

Other examples include a simulation system that sets a scenario of travel of a vehicle in a virtual space, and allows the vehicle to travel in accordance with the scenario.

However, these simulation systems of the virtual space are intended for nothing more than representation of travel environment in which an automobile moves in the virtual space, and simulation of travel and behavior of the automobile in the travel environment. It is therefore difficult to use these simulation systems as a simulation system for a control apparatus to be installed in a vehicle configured to provide driving assistance or automated driving.

Supplying data regarding the travel environment in the virtual space does not suffice for a control apparatus for an automobile to carry out a control for driving assistance or automated driving.

A control apparatus for an automobile is supplied with detection signals of autonomous sensors from various autonomous sensors provided in a vehicle. The use of the detection signals of the autonomous sensors in a control makes it possible for the control apparatus to control travel of the automobile by autonomous driving assistance or automated driving.

As described, what is desired in developments of control apparatuses for vehicles such as automobiles is to develop a surrounding space data providing system such as a simulation system for practical use in control apparatuses for vehicles.

Such a desire is not limited to a simulation system for use in a control apparatus for a vehicle. For example, there have been a potential desire for such a surrounding space data providing system, in developments for practical use of a real-time space data providing system. A real-time space data providing system provides a vehicle traveling in the real space by driving assistance or automated driving, with data regarding a mapping space such as a virtual space, for use in a travel control of the vehicle.

Some example embodiments of the technology will now be described in detail with reference to the accompanying drawings.

First Embodiment

FIG. 1 is an explanatory diagram of a control system of an automobile 1 configured to provide autonomous driving assistance or automated driving.

In one embodiment of the disclosure, the automobile 1 may serve as a "vehicle". Referring to FIG. 1, the control system of the automobile 1 may include an imaging device 2, an object estimation device 3, a three-dimensional (3-D) map device 4, a travel control device 5, an actuator 6, a vehicle motion sensor 7, a positional data generation device 8, and a vehicle communication device 9. The imaging device 2 may capture surroundings of the automobile 1, or an outside of the automobile 1, to generate a captured image. The object estimation device 3, the three-dimensional map device 4, and the travel control device 5 may serve as a control apparatus 10 for the automobile 1. The control apparatus 10 is configured to control travel of the automobile 1.

The actuator 6 may control operation of unillustrated devices that realize the travel of the automobile 1, such as an engine, a motor, a transmission, a braking device, and a steering device, without limitation. The actuator 6 may be provided in a plurality, for example, per device.

The vehicle motion sensor 7 may detect a motion of the automobile 1 caused by, for example, the travel of the automobile 1. The vehicle motion sensor 7 may include, for example, an acceleration rate sensor or a speed sensor. The acceleration rate sensor may detect, for example, acceleration rates of the automobile 1 in three axial directions, i.e., longitudinal, lateral, and vertical directions. The speed sensor may detect, for example, speeds of the automobile 1 in the three axial directions, i.e., the longitudinal, lateral, and vertical directions. The vehicle motion sensor 7 may detect the motion of the automobile 1 caused by the travel of the automobile 1 and output detected data as posture data to the travel control device 5.

The travel control device 5 may control the travel of the automobile 1, and output a control signal to the actuator 6. For example, the travel control device 5 may control the travel of the automobile 1 on the basis of driving operations of an occupant, or alternatively, the travel control device 5 may control the travel of the automobile 1 by automated driving. The travel control device 5 may provide driving assistance to adjust the travel of the automobile 1 by manual driving or automated driving with the use of various kinds of data detected or generated by the own vehicle. The automobile 1 configured to travel in this way is able to travel by autonomous driving assistance or automated driving.

The positional data generation device 8 may receive radio waves from, for example, GNSS (Global Navigation Satellite System) satellites, and generate a current position and current time of the automobile 1 in which the positional data generation device 8 is provided. The positional data generation device 8 may output the current position and the current time thus generated of the automobile 1 as positional data to the travel control device 5.

The three-dimensional map device 4 may output, for example, map data around the current position of the automobile 1 to the travel control device 5.

The imaging device 2 may serve as one of autonomous sensors provided in the automobile 1. That is, in one embodiment of the disclosure, the imaging device 2 may serve as an "autonomous sensor". The imaging device 2 may capture a surrounding space around the automobile 1. The imaging device 2 may include, for example, a monocular camera device. The monocular camera device may be provided in an upper portion of a front windshield, and oriented forward of the automobile 1, for example. In this case, the monocular camera device may capture the surrounding space around the automobile 1 in a forward direction, i.e., a traveling direction of the automobile 1, generate the captured image in a two-dimensional plane, and output the captured image as a captured image signal of a predetermined signal format. In one embodiment of the disclosure, the captured image signal may serve as a "detection signal" of the autonomous sensor. The captured image signal may be transmitted to the control apparatus 10 through, for example, a signal cable for images, and inputted to the control apparatus 10. The captured image signal may be branched in the control apparatus 10, and inputted to the object estimation device 3 and to the travel control device 5. A plurality of the imaging devices 2 may be provided in the automobile 1. For example, the plurality of the imaging devices 2 may be oriented to avoid overlap between their viewing angles, to capture the surroundings of the automobile 1 in all directions through 360 degrees. In this case, the control apparatus 10, the object estimation device 3, and the travel control device 5 may be supplied with a plurality of the captured image signals from the plurality of the imaging devices 2. It is to be noted that the imaging device 2 may include a compound-eye camera device such as a stereo camera device, without limitation. The compound-eye camera device may include a plurality of cameras, and output one of a plurality of images captured by the plurality of the cameras, or an image obtained by synthesizing all the plurality of the images captured by the plurality of the cameras, to the control apparatus 10, the object estimation device 3, and the travel control device 5.

The vehicle communication device 9 may communicate with the outside of the automobile 1. The vehicle communication device 9 may generate a communication path with, for example, a base station 81 (see FIG. 8) of a mobile communication network, a base station 81 (see FIG. 8) of a traffic data distribution network, a moving object such as a surrounding automobile, a mobile terminal carried by a pedestrian, etc., or a communication satellite, without limitation. The vehicle communication device 9 may transmit and receive data to and from an unillustrated server device through the communication path generated. The vehicle communication device 9 may output, for example, data received from the server device to the control apparatus 10. The vehicle communication device 9 may transmit data transmitted from the control apparatus 10 to, for example, the server device. Non-limiting examples of the received data may include: a path, a course, and a travelable range for automated driving; current or future positions, traveling speeds, and traveling directions of nearby surrounding automobiles; and the captured images of the surrounding space. Non-limiting examples of the transmitted data may include: a current or future position, a traveling speed, a traveling direction, a course, an assumed movement range, and a path of the automobile 1 as an own vehicle.

The object estimation device 3 may include a processor to which the captured image signal as the detection signal is inputted from the imaging device 2 and which carries out processing on the captured image of the surrounding space included in the captured image signal. For example, the object estimation device 3 may estimate an estimation frame for an image range of a nearby surrounding automobile in the captured image. On the basis of the estimation frame thus estimated, the object estimation device 3 may generate a position, a direction, and an interval, i.e., a distance, of a surrounding automobile relative to the own vehicle in the real space. In this case, the object estimation device 3 may output data regarding the position, the direction, and the interval, i.e., the distance, of the surrounding automobile, as a result of the processing on the captured image, to the travel control device 5.

The travel control device 5 may control the autonomous travel of the automobile 1 with the use of the data obtained from these devices. For example, with the use of the result of the processing on the captured image by the object estimation device 3, the travel control device 5 may control the travel of the automobile 1, to keep the automobile 1 from coming close to a surrounding automobile present around the own vehicle. The travel control device 5 may output control data to the actuator 6. The control data is provided for a travel control.

Although not illustrated, elements in the figure may be coupled to one another through a vehicle network of the control system provided in the automobile 1. Non-limiting examples of the vehicle network may include a CAN (Controller Area Network), a LIN (Local Interconnect Network), a LAN (Local Area Network), FlexRay, a CXPI (Clock Extension Peripheral Interface). The vehicle network may include, for example, a plurality of bus cables coupled to a plurality of devices, and a central gateway (CGW) as a relay device to which the plurality of the bus cables is bus-coupled. A plurality of control ECUs may transmit and receive data by mutually transmitting and receiving messages through the vehicle network. Thus, elements provided in the control system of the automobile 1 may control the automobile 1 in cooperation.

As described, the automobile 1 configured to provide autonomous driving assistance or the travel control by automated driving may include a plurality of the autonomous sensors. The autonomous sensors may each capture the surroundings of the automobile 1 and output the captured image signal to the control apparatus 10. The autonomous sensors may include, for example, the imaging devices 2. The detection signals of the autonomous sensors such as the imaging devices 2 may be inputted to the control apparatus 10 for the automobile 1. For example, the object estimation device 3 of the control apparatus 10 may be supplied with the captured image signal from the imaging device 2, and perform processing of detecting a surrounding automobile with the use of the detection signals of the autonomous sensors.

Developments of the automobile 1 configured to provide autonomous driving assistance or the travel control by automated driving as described are currently underway by carrying out driving tests of the automobile 1 in closed areas for testing of the automobile 1, or in areas where travel by driving assistance or automated driving is exceptionally permitted within open regions where ordinary automobiles are traveling.

However, areas are limited in which travel by driving assistance or automated driving is permitted. Moreover, carrying out driving tests sometimes involves imposing restrictions on traffic of other automobiles in open regions. Even if such driving tests contribute to developments of the automobile 1 configured to provide driving assistance or automated driving, this does not ensure that the driving assistance or the automated driving has optimal reliability and safety in areas where ordinary automobiles are traveling without any restrictions. Tests in deliberately restricted areas may be possibly insufficient in terms of contents of tests. Furthermore, a single driving test involves a lot of personnel and time. Such loads may cause an increase in development costs for the automobile 1 configured to provide driving assistance or automated driving, resulting in potential hindrance to early spread of the automobile 1 configured to provide driving assistance or automated driving.

A possible plan may be, for example, to carry out a driving test of the control apparatus 10 for the automobile 1 configured to provide driving assistance or automated driving, with the use of a simulation system of a virtual space to be traveled virtually by the automobile 1. Representing realistic travel environment in the virtual space in the simulation system is expected to enhance reliability and safety regarding driving assistance or automated driving to be provided by the control apparatus 10 for the automobile 1.

However, currently available simulation systems of a virtual space are intended for nothing more than representation of travel environment in which the automobile 1 moves in the virtual space, and simulation of travel and behavior of the automobile 1 in the travel environment. These simulation systems do not suffice for a simulation system for the control apparatus 10 to be installed in the automobile 1 configured to provide driving assistance or the travel control by automated driving.

The control apparatus 10 for the automobile 1 may include, for example, the object estimation device 3 as mentioned above. Supplying data regarding the travel environment in the virtual space does not suffice for the control apparatus 10 to carry out a control for driving assistance or automated driving.

The control apparatus 10 for the automobile 1 is supplied with the detection signals of the autonomous sensors from the various autonomous sensors provided in the automobile 1. The use of the detection signals of the autonomous sensors in a control makes it possible for the control apparatus 10 to control the travel of the automobile 1 by autonomous driving assistance or automated driving.

As described, what is desired in developments of the control apparatus 10 for the automobile 1 is to develop a simulation system for practical use in the control apparatus 10 for the automobile 1.

In this embodiment, a basic example is described of a surrounding space data providing system 20 for the automobile 1 configured to provide autonomous driving assistance or the travel control by automated driving as mentioned above.

Figure 2:
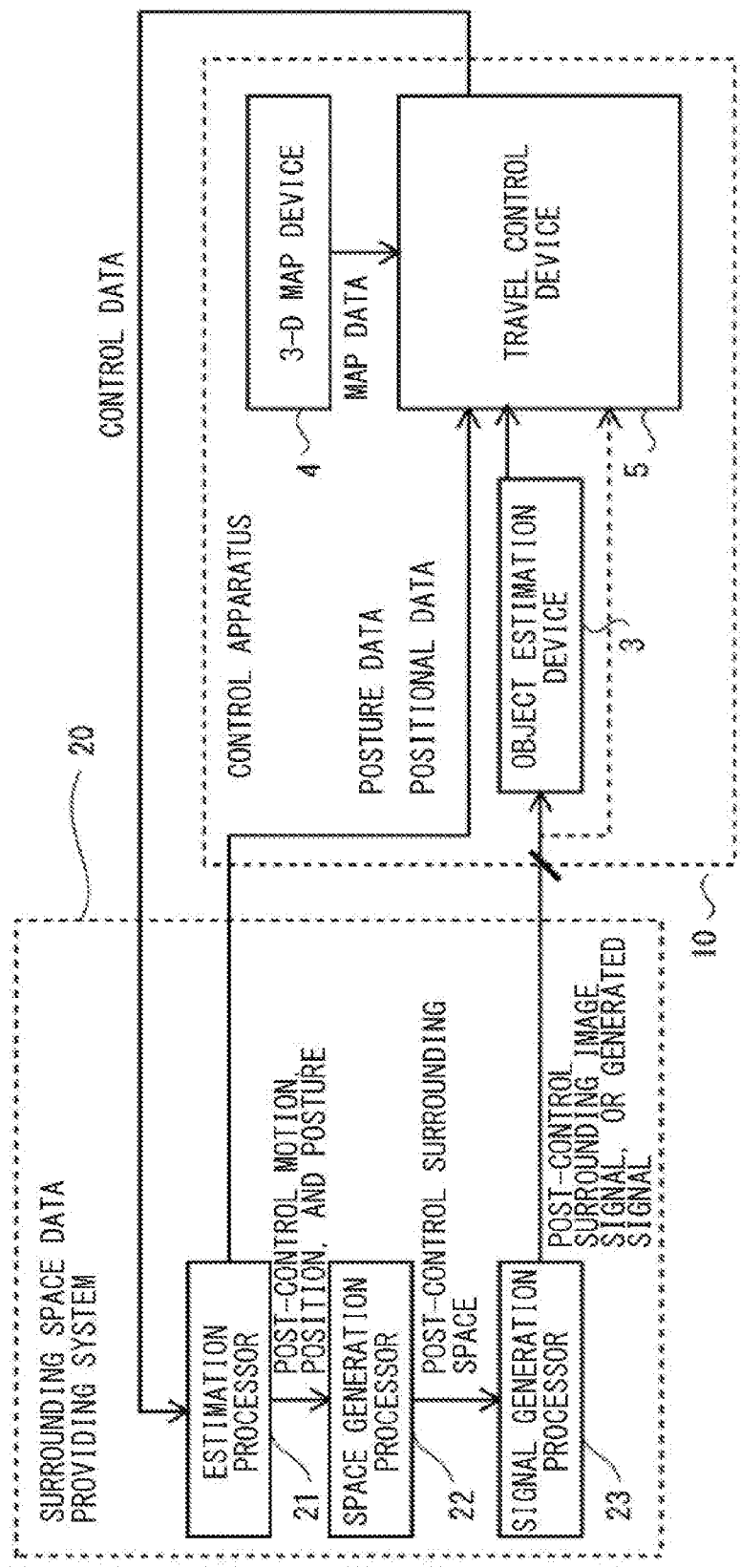
FIG. 2 is an explanatory diagram of a surrounding space data providing system for a control apparatus for the automobile illustrated in FIG. 1, according to a first embodiment of the disclosure.

FIG. 2 is an explanatory diagram of the surrounding space data providing system 20 for the control apparatus 10 for the automobile 1 illustrated in FIG. 1, according to a first embodiment of the disclosure.

FIG. 2 also illustrates the control apparatus 10 for the automobile 1. The control apparatus 10 may be coupled to the surrounding space data providing system 20.

The surrounding space data providing system 20 in FIG. 2 may provide space data to the control apparatus 10 for the automobile 1 configured to provide autonomous driving assistance or the travel control by automated driving. The space data is produced by simulation of a virtual space to be traveled virtually by the automobile 1. Here, the space data may include a surrounding image.

The surrounding space data providing system 20 in FIG. 2 may include, without limitation, an estimation processor 21, a space generation processor 22, and a signal generation processor 23.

The estimation processor 21 may be supplied with the control data. The control data is outputted by the travel control device 5 of the control apparatus 10 to control the travel of the automobile 1. The control apparatus 10 including the travel control device 5 and the object estimation device 3, without limitation, may perform processing on each control cycle and update the control data.

On the basis of the control data inputted from the travel control device 5, the estimation processor 21 may estimate a motion of the automobile 1 that changes by the control, or a post-control position and a post-control posture of the automobile 1. The estimation processor 21 may estimate the motion that occurs in the automobile 1 as a result of operation of the actuator 6 based on the control data, the post-control position and the post-control posture of the automobile 1 as a result of the motion.

For example, the estimation processor 21 may add or subtract an amount of change caused by the control data this time, to or from an inertial movement and motion from a previous post-control position and a previous post-control posture of the automobile 1, to estimate the post-control position and the post-control posture of the automobile 1. Moreover, the estimation processor 21 may estimate the post-control position and the post-control posture of the automobile 1 in consideration of, for example, a frictional state between tires of the automobile 1 and a road surface.

The estimation processor 21 may return the post-control motion, the post-control position, and the post-control posture thus estimated of the automobile 1, to the travel control device 5 of the control apparatus 10. This makes it possible for the travel control device 5 to obtain data regarding the post-control motion, the post-control position, and the post-control posture of the automobile 1, even if the travel control device 5 is not coupled to the vehicle motion sensor 7 and the positional data generation device 8 provided in the automobile 1. It is possible for the travel control device 5 to obtain the data regarding the post-control motion, the post-control position, and the post-control posture of the automobile 1 as a response to the control, as with the case where the travel control device 5 is coupled to the vehicle motion sensor 7 and the positional data generation device 8 provided in the automobile 1, and to make a control on each control cycle.

The space generation processor 22 may acquire the data regarding the post-control motion, the post-control position, and the post-control posture of the automobile 1 estimated by the estimation processor 21.

On the basis of the post-control motion, the post-control position, and the post-control posture of the automobile 1 estimated by the estimation processor 21, the space generation processor 22 may generate the surrounding space around the automobile 1 with the automobile 1 assuming the post-control position and the post-control posture.

The space generation processor 22 may generate the surrounding space around the automobile 1 with the automobile 1 assuming the post-control position and the post-control posture, in further consideration of a scenario of the travel of the automobile 1 in, for example, a virtual space.

Here, the surrounding space around the automobile 1 may be based on a virtual space, or alternatively, the surrounding space around the automobile 1 may be based on the real space to be traveled actually by the automobile 1. Non-limiting examples of the real space may include the real space itself, or a mapping space onto which the real space is mapped in advance with high accuracy. In another alternative, the surrounding space around the automobile 1 may be based on a mixed space of the real space and a virtual space.

Moreover, the surrounding space around the automobile 1 may be a two-dimensional space or a three-dimensional space. The two-dimensional space may two-dimensionally include solely a road surface on which the automobile 1 travels. The three-dimensional space may include travel environment of the automobile 1 including three-dimensional objects such as buildings. In the three-dimensional surrounding space, the road surface on which the automobile 1 travels may be included three-dimensionally so that the road surface has unevenness.

The signal generation processor 23 may acquire data regarding the post-control surrounding space around the automobile 1 generated by the space generation processor 22.

The signal generation processor 23 may further acquire the data regarding the post-control motion, the post-control position, and the post-control posture of the automobile 1 estimated by the estimation processor 21.

The signal generation processor 23 may generate a two-dimensional surrounding image, as the surrounding space around the automobile 1 is viewed with a viewpoint position set at the imaging device 2 provided in the post-control automobile 1. The surrounding image may conform to an imaging range, or an angle of view, of the imaging device 2 provided in the automobile 1.

Moreover, prior to the generation of the surrounding image, the signal generation processor 23 may arrange moving objects in the surrounding space around the automobile 1 acquired. Non-limiting examples of the moving objects may include surrounding automobiles moving around the automobile 1. The moving objects such as surrounding automobiles may move in the surrounding space around the automobile 1, on the basis of their respective scenarios. In this case, the signal generation processor 23 may be able to generate the surrounding image including, for example, surrounding automobiles moving.

Furthermore, as in embodiments to be described later, the signal generation processor 23 may perform distortion processing on the surrounding image.

The signal generation processor 23 may output a surrounding image signal including the surrounding image generated, to the object estimation device 3 of the control apparatus 10. In one embodiment of the disclosure, the surrounding image signal may serve as a "generated signal". The surrounding image signal may be the same as the captured image signal the imaging device 2 provided in the automobile 1 outputs to the object estimation device 3 of the control apparatus 10. The surrounding image signal may have the same signal format as that of the captured image signal, and the same form of waveform components other than a waveform component based on the image included in the signal. The object estimation device 3 may be able to process the surrounding image included in the surrounding image signal in a similar manner to the captured image included in the captured image signal.

In this way, coupling the surrounding space data providing system 20 of this embodiment to the control apparatus 10 for the automobile 1 allows the control apparatus 10 for the automobile 1 to be supplied with the signals and the data similar to those in a case where the surrounding space data providing system 20 is provided in the automobile 1. With the use of the signals and the data to be supplied from the surrounding space data providing system 20, the control apparatus 10 for the automobile 1 is able to provide autonomous driving assistance or the travel control by automated driving in a similar manner to the case where the surrounding space data providing system 20 is provided in the automobile 1.

Figure 3:
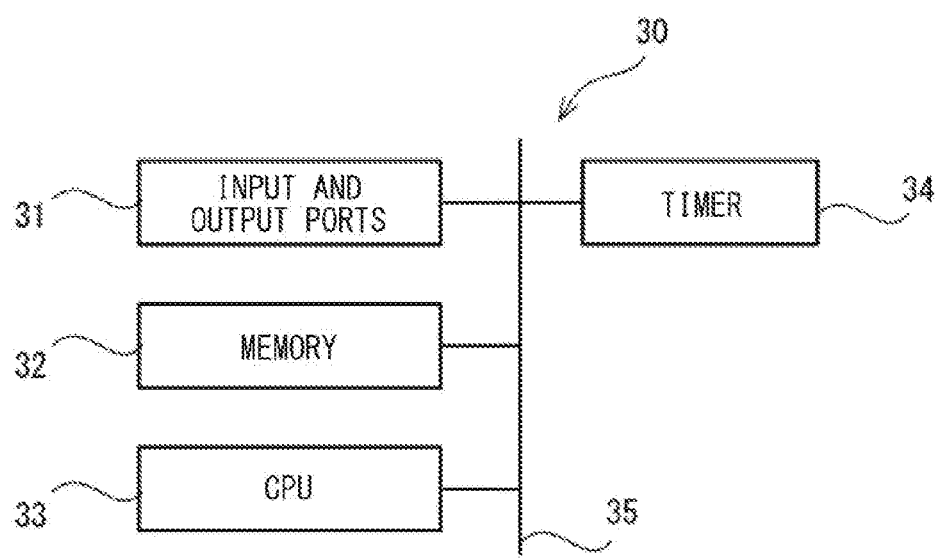
FIG. 3 is an explanatory diagram of an example of a computer device applicable to the surrounding space data providing system illustrated in FIG. 2, or each element thereof.

FIG. 3 is an explanatory diagram of an example of a computer device 30. The computer device 30 may serve as the surrounding space data providing system 20 in FIG. 2, or each element thereof.

The computer device 30 in FIG. 3 may include, without limitation, input and output ports 31, a memory 32, a CPU 33, a timer 34, and an internal bus 35. To the internal bus 35, the input and output ports 31, the memory 32, the CPU 33, and the timer 34 are coupled.

The input and output ports 31 may serve as a physical input and a physical output of the computer device 30.

For example, the input and output ports 31 may include an input terminal dedicated to an image signal. The input terminal is provided for outputting the surrounding image signal to the control apparatus 10 for the automobile 1. The input terminal dedicated to the image signal may include, without limitation, a video terminal.

The timer 34 may measure time and time periods.

The memory 32 may hold programs to be executed by the CPU 33, and data. Non-limiting examples of the data may include setting data and running data. The memory 32 may include, without limitation, a ROM, a RAM, a recording disk, and a semiconductor memory. The memory 32 may be volatile or nonvolatile, but at least the programs to be executed by the CPU 33 and the setting data may be held by the nonvolatile memory 32.

The CPU 33 may include, without limitation, a general-purpose CPU 33 used in a data processor, an ECU used in the automobile 1, or a GPU and an ASIC. The GPU and the ASIC have high performance in special processing such as image processing. The CPU 33 may read and execute the programs held in the memory 32. Thus, the CPU 33 may perform a portion or all of the processing of each element of the surrounding space data providing system 20.

The CPU 33 may acquire, for example, data to be outputted by the control apparatus 10 for the automobile 1, e.g., the control data, from the input and output ports 31 through the internal bus 35.

For example, the CPU 33 may output the surrounding image signal and the data regarding the motion, the position, and the posture of the automobile 1, toward the control apparatus 10 for the automobile 1 from the input and output ports 31 through the internal bus 35.

The surrounding space data providing system 20 in FIG. 2 may include, without limitation, the estimation processor 21, the space generation processor 22, and the signal generation processor 23.

The estimation processor 21, the space generation processor 22, and the signal generation processor 23 may be embodied in the single computer device 30 by the CPU 33 of the single computer device 30 executing the programs.

The estimation processor 21, the space generation processor 22, and the signal generation processor 23 may be embodied in a plurality of the computer devices 30 by the respective CPUs 33 of the plurality of the computer devices 30 executing the programs.

In a case with a high processing load, for example, the signal generation processor 23 may be embodied in the plurality of the computer devices 30, in one-to-one corresponding relation to the plurality of the imaging devices 2 provided in the automobile 1. Some computer devices 30 are configured to output image signals to one or more monitoring devices. The use of such computer devices 30 in a plurality makes it possible to allow the plurality of the computer devices 30 to generate the captured image signals of all the imaging devices 2 simultaneously in parallel, even in a case with a large number of the imaging devices 2 provided in the automobile 1, and to supply the captured image signals to the control apparatus 10 for the automobile 1.

Second Embodiment

Description is given next of a second embodiment of the disclosure. The surrounding space data providing system described in this embodiment is a system that provides the control apparatus 10 for the automobile 1 with simulated space data.

A simulated space data providing system 40 of this embodiment is suitable for use in, for example, developing the control apparatus 10 for the automobile 1.

In this embodiment, similar configurations to the forgoing embodiment are denoted by the same reference characters, and the illustration and description thereof are omitted. In the following description, differences from the forgoing embodiment are mainly described.

Figure 4:
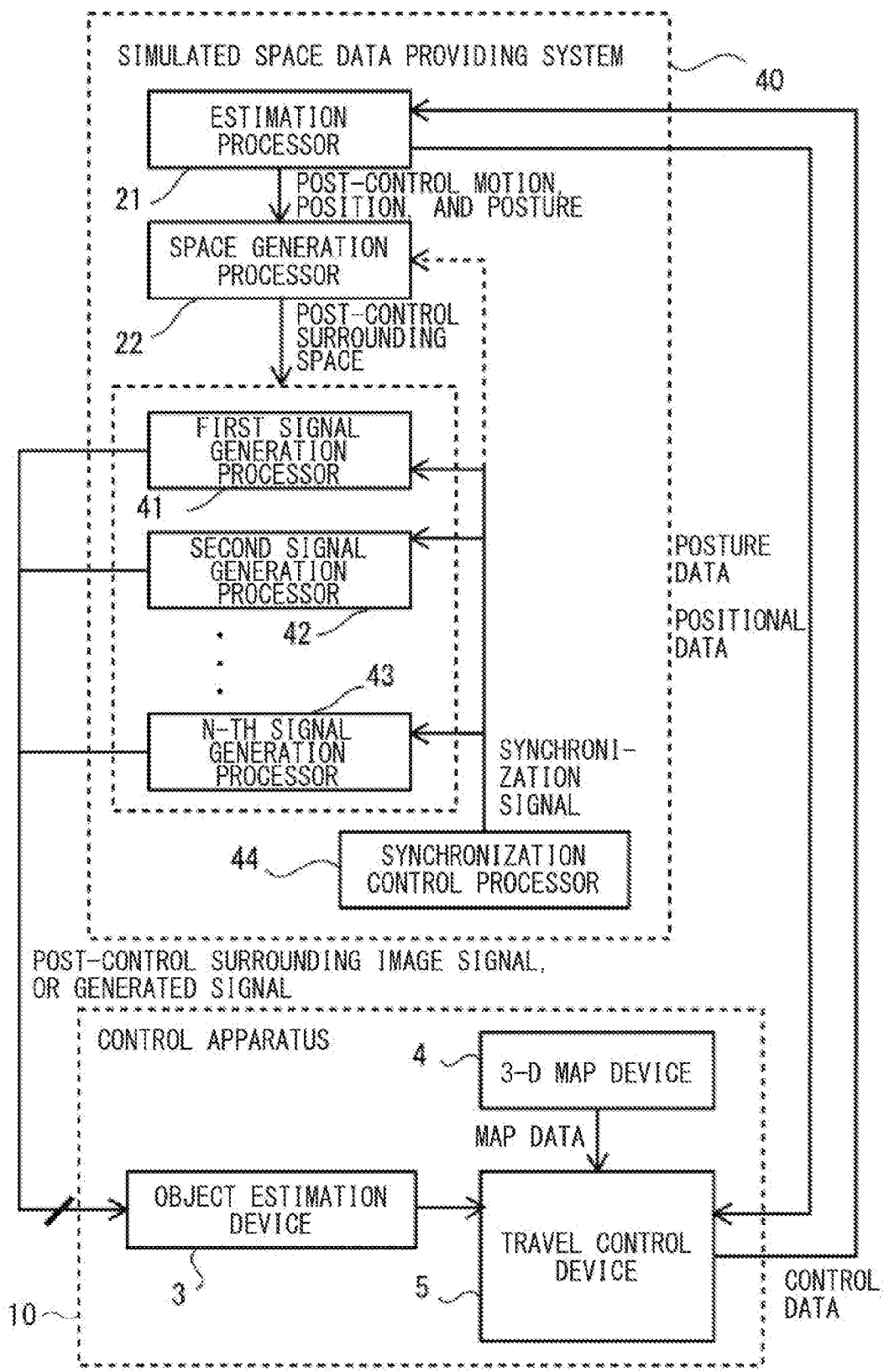
FIG. 4 is an explanatory diagram of a simulated space data providing system that serves as a surrounding space data providing system according to a second embodiment of the disclosure.

FIG. 4 is an explanatory diagram of the simulated space data providing system 40 as the surrounding space data providing system according to the second embodiment of the disclosure.

FIG. 4 also illustrates the control apparatus 10 for the automobile 1. The control apparatus 10 may be coupled to the simulated space data providing system 40. The object estimation device 3 of the control apparatus 10 for the automobile 1 may be supplied with the captured image signals of the plurality of the imaging devices 2 provided in the automobile 1.

The simulated space data providing system 40 in FIG. 4 may provide the control apparatus 10 for the automobile 1 configured to provide autonomous driving assistance or the travel control by automated driving, with space data by simulation of a virtual space to be traveled virtually by the automobile 1.

The simulated space data providing system 40 in FIG. 4 may include, without limitation, the estimation processor 21, the space generation processor 22, a plurality of signal generation processors, e.g., a first signal generation processor 41 to an n-th signal generation processor 43, and a synchronization control processor 44. Here, n is an integer of 1 or more.

The plurality of the signal generation processors 41 to 43 and the synchronization control processor 44 illustrated in FIG. 4 may be embodied in the plurality of the computer devices 30.

The plurality of the signal generation processors, e.g., the first signal generation processor 41 to the n-th signal generation processor 43, may be similar to those described in the forgoing embodiment. Because the control apparatus 10 for the automobile 1 to which the simulated space data providing system 40 is coupled is supplied with the captured image signals of the plurality of the imaging devices 2 provided in the automobile 1, the signal generation processors 41 to 43 may be provided in a plurality to generate the same number of the surrounding image signals as the number of the imaging devices 2. The plurality of the signal generation processors 41 to 43 may each acquire the data regarding the post-control surrounding space around the automobile 1 generated by the space generation processor 22. The plurality of the signal generation processors 41 to 43 may each further acquire the data regarding the post-control motion, the post-control position, and the post-control posture of the automobile 1 estimated by the estimation processor 21.

The plurality of the signal generation processors, e.g., the first signal generation processor 41 to the n-th signal generation processor 43, may each arrange moving objects in the surrounding space around the automobile 1 acquired. Non-limiting examples of the moving objects may include surrounding automobiles moving around the automobile 1. The plurality of the signal generation processors, e.g., the first signal generation processor 41 to the n-th signal generation processor 43, may generate distributively the surrounding images of the post-control surrounding space around the automobile 1 with the viewpoint position set at corresponding ones of the imaging devices 2 providing in the automobile 1. The plurality of the signal generation processors, e.g., the first signal generation processor 41 to the n-th signal generation processor 43, may generate the surrounding images that conform to the imaging ranges, or the angles of view, of respective ones of the imaging devices 2.

The plurality of the signal generation processors, e.g., the first signal generation processor 41 to the n-th signal generation processor 43, may each output the surrounding image signal including the surrounding image generated, to the object estimation device 3 of the control apparatus 10.

The object estimation device 3 of the control apparatus 10 may be supplied with the same number of the surrounding image signals as the number of the imaging devices 2 provided in the automobile 1, as with a case where the simulated space data providing system 40 is provided in the automobile 1. The object estimation device 3 is configured to process the plurality of the surrounding images included in the plurality of the surrounding image signals, as with a case where the plurality of the captured image signals is supplied from the plurality of the imaging devices 2 provided in the automobile 1.

The synchronization control processor 44 may generate a synchronization signal and output the synchronization signal to the plurality of the signal generation processors 41 to 43. The synchronization control processor 44 may output the synchronization signal to the space generation processor 22. The synchronization signal is provided for causing the plurality of the signal generation processors 41 to 43 to perform processing at regular time intervals on the basis of the synchronization signal. The cycles of the synchronization signal may be equal to or shorter than the control cycles of the control apparatus 10 for the automobile 1. Thus, on the basis of the synchronization signal supplied in common, the plurality of the signal generation processors, e.g., the first signal generation processor 41 to the n-th signal generation processor 43, may update the plurality of the surrounding image signals to be outputted to the control apparatus 10, to synchronize the plurality of the surrounding image signals with one another on the control cycles of the control apparatus 10 or shorter. In a case where the control apparatus 10 for the automobile 1 makes a new control on each control cycle, the control apparatus 10 may be supplied with the new surrounding image signal by a control based on the synchronization signal.

It is to be noted that in this embodiment, the synchronization control processor 44 is described as a separate element from other elements of the simulated space data providing system 40.

In an alternative example, the synchronization control processor 44 may be provided in the simulated space data providing system 40 as a sub-element of the space generation processor 22. In this case, the space generation processor 22, as the synchronization control processor 44, may generate the synchronization signal in synchronization with generating and outputting the surrounding space, to output the synchronization signal to the plurality of the signal generation processors, e.g., the first signal generation processor 41 to the n-th signal generation processor 43.

Figure 5:
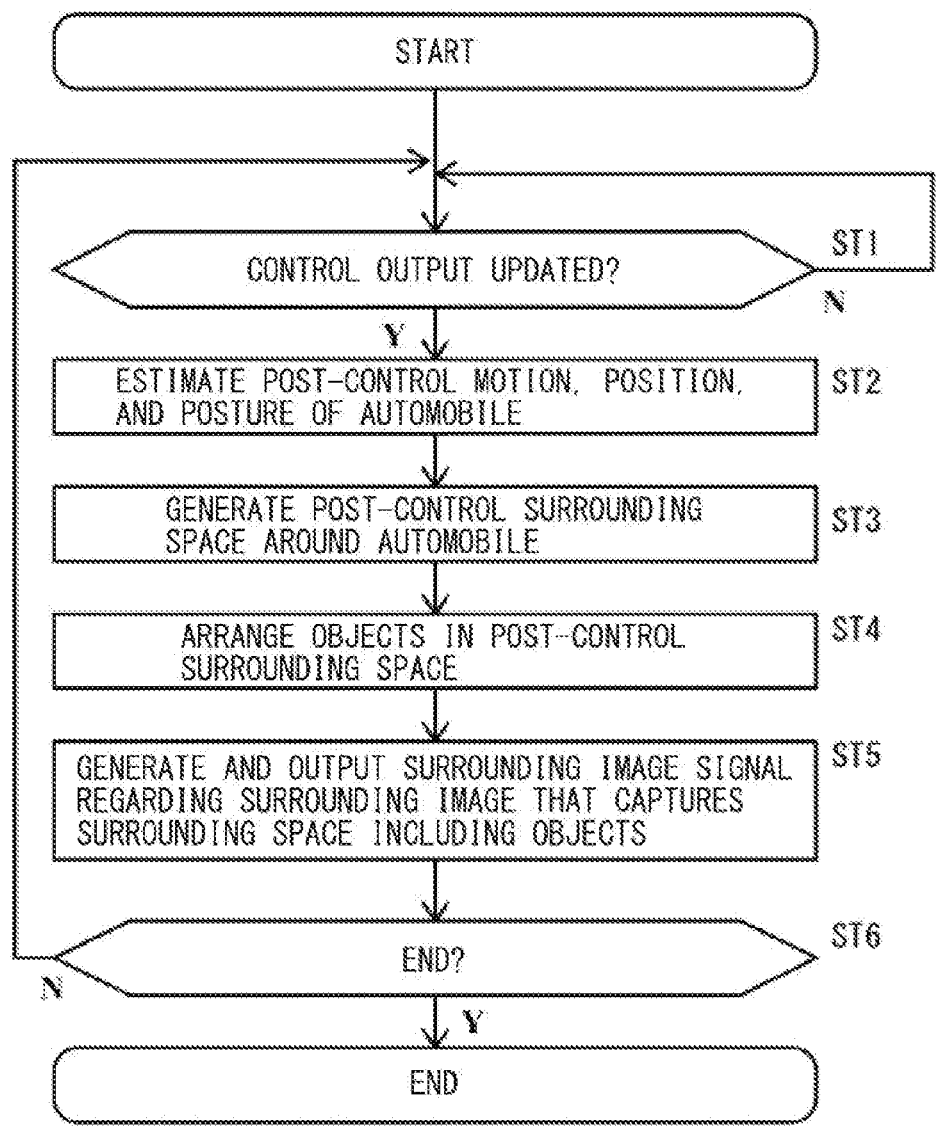
FIG. 5 is a flowchart of an example of an overall space data providing control in the simulated space data providing system illustrated in FIG. 4.

FIG. 5 is a flowchart of an example of an overall space data providing control in the simulated space data providing system 40 in FIG. 4.

The CPU 33 of the computer device 30 may repeatedly carry out the space data providing control for simulation in FIG. 5. The space data providing control for the simulation in FIG. 5 may be carried out distributively by the CPUs 33 of the plurality of the computer devices 30.

In step ST1, the CPU 33 may determine whether or not a control output of the control apparatus 10 has been updated. The travel control device 5 of the control apparatus 10 may update the control data on each control cycle and output the control data. In a case where the control data from the travel control device 5 of the control apparatus 10 has not been updated (N in step ST1), the CPU 33 may repeat this process. In a case where the control data has been updated (Y in step ST1), the CPU 33 may determine that the control output of the control apparatus 10 has been updated and cause the flow to proceed to step ST2.

Note that the CPU 33 may determine whether or not it is update timing on the basis of an update period measured by the timer 34.

In another alternative, the CPU 33 may determine whether or not estimation data of the estimation processor 21 has been updated instead of the control data of the control apparatus 10.

In step ST2, the CPU 33, as the estimation processor 21, may estimate, on the basis of the control data to be supplied from the travel control device 5 of the control apparatus 10, the motion of the automobile 1 that changes by the control, or the post-control position and the post-control posture of the automobile 1. The estimation processor 21 may estimate the motion that occurs in the automobile 1 as the result of the operation of the actuator 6 based on the control data, and/or the post-control position and the post-control posture of the automobile 1 as the result of the motion. Thereafter, the CPU 33 may output the data regarding the post-control motion, the post-control position, and the post-control posture of the automobile 1 estimated, to the travel control device 5 of the control apparatus 10 through the input and output ports 31.

In step ST3, the CPU 33, as the space generation processor 22, may generate, on the basis of the motion, the position, and the posture of the automobile 1 estimated, the surrounding space around the automobile 1 with the automobile 1 assuming the post-control position and the post-control posture.

In step ST4, the CPU 33, as the plurality of the signal generation processors, e.g., the first signal generation processor 41 to the n-th signal generation processor 43, or a portion thereof, may arrange moving objects in the surrounding space around the automobile 1 acquired. Non-limiting examples of the moving objects may include surrounding automobiles moving around the automobile 1. In this way, the CPU 33 may generate the surrounding image of environment in which the mobile objects are moving.

In step ST5, the CPU 33, as the plurality of the signal generation processors, e.g., the first signal generation processor 41 to the n-th signal generation processor 43, or a portion thereof, may generate the two-dimensional surrounding image, as the surrounding space around the automobile 1 is viewed with the viewpoint position set at the imaging device 2 provided in the post-control automobile 1. The surrounding image may conform to the imaging range, or the angle of view, of the imaging device 2 provided in the automobile 1. Thereafter, the CPU 33 or the plurality of the CPUs 33, as the plurality of the signal generation processors, e.g., the first signal generation processor 41 to the n-th signal generation processor 43, or a portion thereof, may output the surrounding image signal including the surrounding image generated, to the object estimation device 3 of the control apparatus 10 through the input and output ports 31.

In step ST6, the CPU 33 may determine whether or not to end the space data providing control for the simulation in FIG. 5. For example, in a case where the automobile 1 has traveled to an end of the scenario of the movement of the automobile 1 (Y in step ST6), the CPU 33 may determine that the space data providing control is to be ended, and end the control. In a case where the space data providing control is not to be ended (N in step ST6), the CPU 33 may cause the flow to return to step ST1. In this case, the CPU 33 may repeatedly carry out the space data providing control from step ST1 to step ST6. Every time the CPU 33 determines in step ST1 that the control output of the control apparatus 10 has been updated (Y in step ST1), the CPU 33 may perform the processes from step ST2 to step ST5 to generate and output the updated surrounding image signal. The surrounding image signal to be supplied to the control apparatus 10 may be updated on each control cycle of the control apparatus 10. In the control for each control cycle of the control apparatus 10, the control may be carried out with the use of the new surrounding image signal that has been updated in accordance with the previous control.

Figure 6:
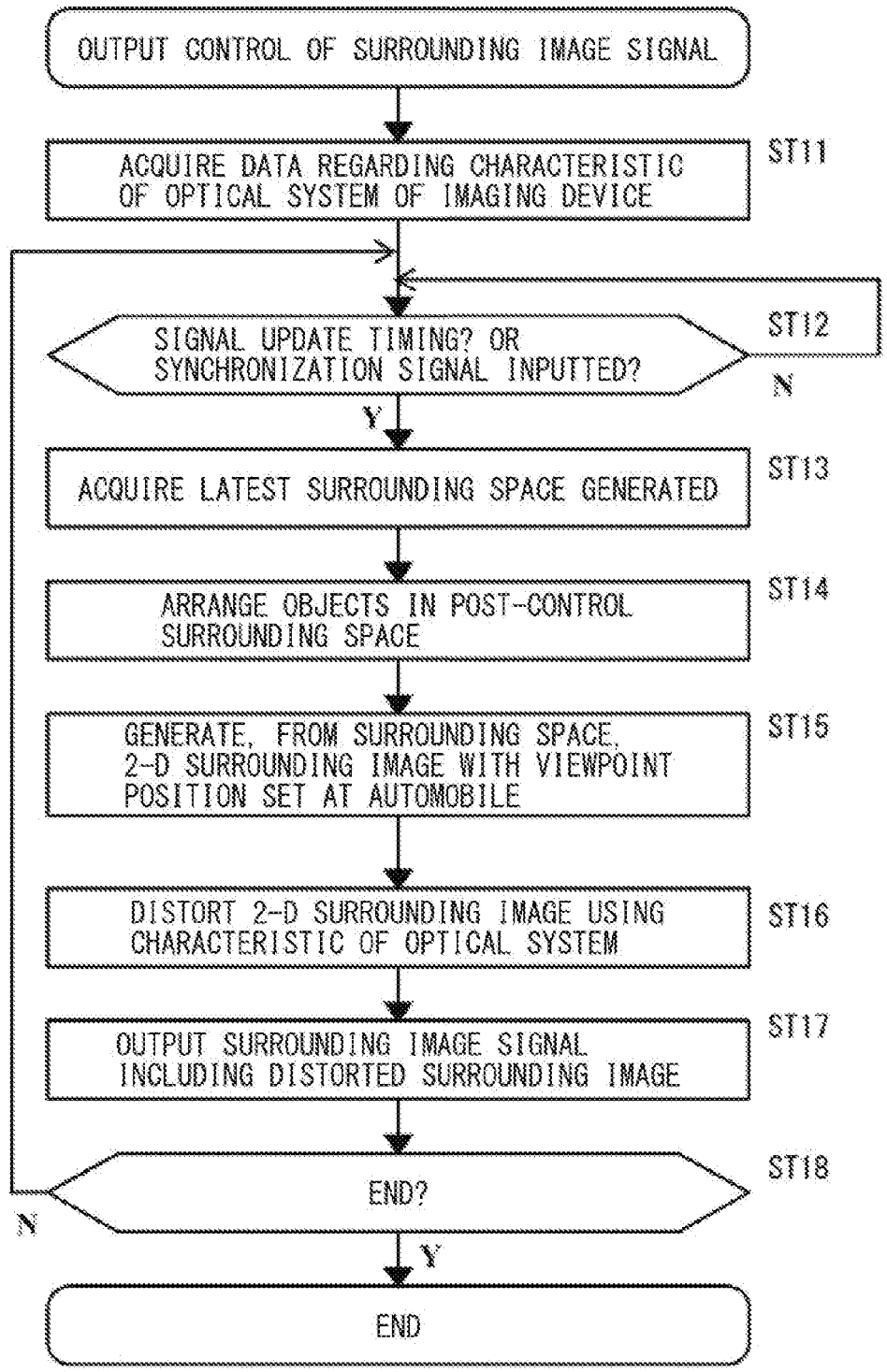
FIG. 6 is a flowchart of an example of an output control of a surrounding image signal by a signal generation processor.

FIG. 6 is a flowchart of an example of an output control of the surrounding image signal by the signal generation processors 41 to 43.

The CPU 33 of the computer device 30, as the signal generation processors 41 to 43, may make the output control of the surrounding image signal in FIG. 6 in, for example, step ST5 in FIG. 5.

In step ST11, the CPU 33 may acquire data regarding a characteristic of an optical system such as a lens of the imaging device 2 with which the CPU 33 is associated. The data regarding the characteristic of the optical system such as the lens of the imaging device 2 may be held in, for example, the memory 32. In a case where the data regarding the characteristics of the optical systems of the plurality of the imaging devices 2 is held in the memory 32, the CPU 33 may select and acquire the data regarding the characteristic of the optical system of one of the imaging devices 2 on the basis of the setting or the data to be acquired from the control apparatus 10.

In step ST12, the CPU 33 may determine whether or not it is the update timing of the surrounding image signal to be outputted to the control apparatus 10. For example, the CPU 33 may determine whether or not it is the update timing on the basis of the update period measured by the timer 34. In a case where it is not the update timing of the surrounding image signal (N in step ST12), the CPU 33 may repeat this process. In a case where it is the update timing of the surrounding image signal (Y in step ST12), the CPU 33 may cause the flow to proceed to step ST13.

It is to be noted that the CPU 33 may determine whether or not it is the update timing of the surrounding image signal, on the basis of whether or not the output of the control apparatus 10 or the estimation processor 21 has been updated.

In step ST13, the CPU 33 may acquire the data regarding the latest post-control surrounding space around the automobile 1 generated by the space generation processor 22.

In step ST14, the CPU 33 may arrange moving objects in the surrounding space acquired. Non-limiting examples of the moving objects may include surrounding automobiles moving around the automobile 1.

In step ST15, the CPU 33 may generate the two-dimensional surrounding image, as the surrounding space after the arrangement process in step ST14 is viewed with the viewpoint position set at the imaging device 2 provided in the post-control automobile 1. The surrounding image may conform to the imaging range, or the angle of view, of the imaging device 2 provided in the automobile 1.

In step ST16, the CPU 33 may perform the distortion processing on the two-dimensional surrounding image generated in step ST15, with the use of the characteristic of the optical system acquired in step ST11. The CPU 33 may perform a process of distorting the surrounding image with the automobile 1 assuming the post-control position and the post-control posture, in accordance with the characteristic of the optical system of the imaging device 2. In this way, the surrounding image is obtained that includes a similar distortion component to the image captured by the imaging device 2.

The imaging device 2 that captures the surroundings of the automobile 1 may include the unillustrated lens to be used in the optical system of the imaging device 2. The unillustrated lens is basically a wide-angle lens. The captured image by the wide-angle lens has small distortion in its center portion, and large distortion in its peripheral portion. It suffices that the data regarding the characteristic of the optical system causes such distortion in the surrounding image. It is to be noted that the distortion caused in the image by the data regarding the characteristic of the optical system does not have to exactly match the distortion that occurs in the image in the imaging device 2 with which the CPU 33 is associated.

In step ST17, the CPU 33 may output the surrounding image signal including the surrounding image distorted by the process of step ST16, to the object estimation device 3 of the control apparatus 10. This makes it possible for the object estimation device 3 to acquire the similarly distorted image to the captured image included in the captured image signal, as the surrounding image included in the surrounding image signal.

In step ST18, the CPU 33 may determine whether or not to end the output control of the surrounding image signal. For example, in the case where the automobile 1 has traveled to the end of the scenario of the movement of the automobile 1, the CPU 33 may determine that the output control is to be ended, and end the control (Y in step ST18). In a case where the output control is not to be ended (N in step ST18), the CPU 33 may cause the flow to return to step ST12. In this case, the CPU 33 may repeatedly carry out the output control of the surrounding image signal from step ST12 to step ST18. Every time the CPU 33 determines in step ST12 that it is the update timing of the surrounding image signal to be outputted to the control apparatus 10 (Y in step ST12), the CPU 33 may perform the processes from step ST13 to step ST17, and update the surrounding image signal to be outputted to the control apparatus 10.

Figure 7A:
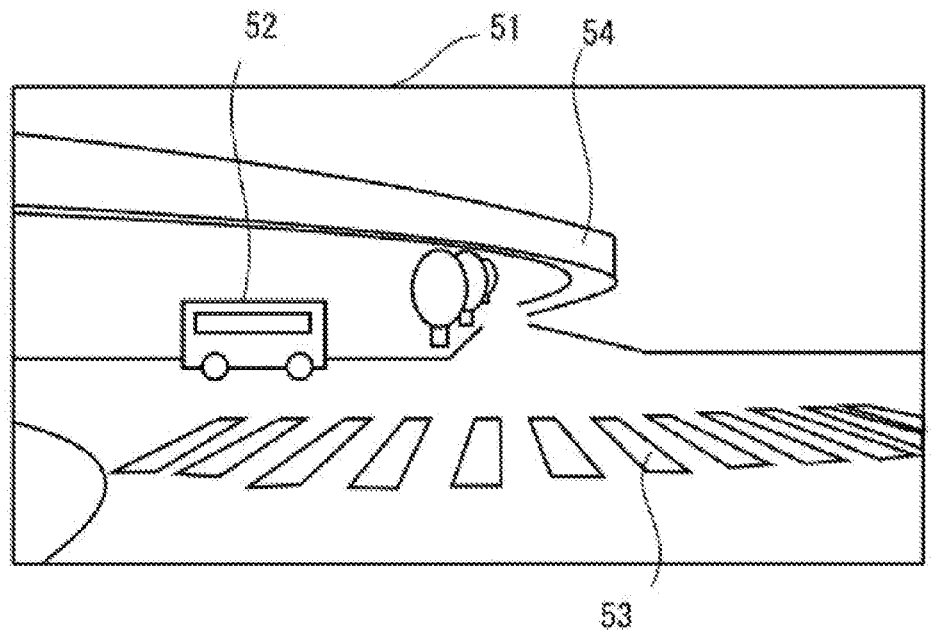
FIGS. 7A and 7B are explanatory diagrams of examples of surrounding images before and after distortion processing based on a characteristic of an optical system such as lenses, by the signal generation processor.
Figure 7B:
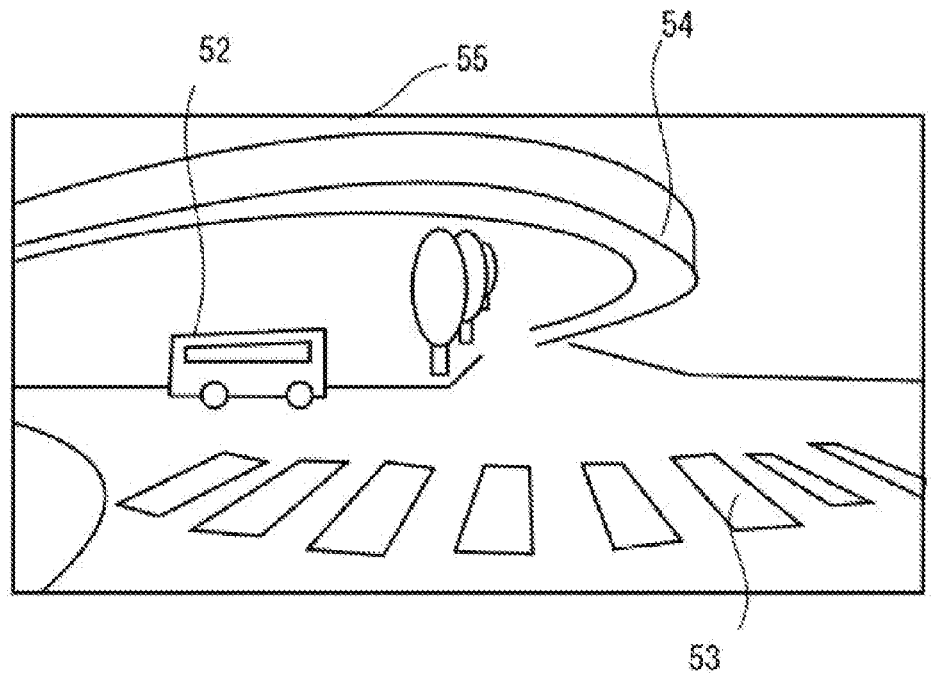

FIGS. 7A and 7B are explanatory diagrams of examples of the surrounding images before and after the distortion processing based on the characteristic of the optical system such as the lens, by the signal generation processors 41 to 43.

FIG. 7A illustrates a surrounding image 51 before the distortion processing. The pre-processing surrounding image 51 in FIG. 7A includes an image component of an intersection of two roads. One road extends along an imaging direction of the image, and the other road crosses it. The surrounding image 51 also includes an image component 52 of a surrounding automobile passing leftward through the intersection, image components 53 of zebra marks of a pedestrian crossing, and an image component 54 of a track of a monorail above the intersection.

The image component of the intersection, the image component 52 of the surrounding automobile, the image components 53 of the zebra marks of the pedestrian crossing, and the image components 54 of the track of the monorail have substantially no distortion. For example, the image components 53 of the zebra marks of the pedestrian crossing are arranged substantially in a straight line.

FIG. 7B illustrates a surrounding image 55 after the distortion processing. The post-processing surrounding image 55 in FIG. 7B includes, as with FIG. 7A, the image component of the intersection, the image component 52 of the surrounding automobile, the image components 53 of the zebra marks of the pedestrian crossing, and the image component 54 of the track of the monorail.

The surrounding image 55 after the distortion processing has an image distortion by the wide-angle lens. For example, the image components on both lateral sides of the image are compressed vertically as compared with FIG. 7A. The image components 53 of the zebra marks of the pedestrian crossing are significantly curved so that both lateral sides of the image are located at higher levels than the middle portion of the image.

The captured image included in the captured image signal is usually distorted, as with the surrounding image after the distortion processing in FIG. 7B. The captured image signal is outputted to the control apparatus 10 by the imaging device 2 that captures the surroundings around the automobile 1. The control apparatus 10 provided in the automobile 1 in combination with the imaging device 2 may make the travel control on the basis of the captured image distorted as in FIG. 7B. In this embodiment, it is possible to provide the control apparatus 10 with the surrounding image similarly distorted to the case where the simulated space data providing system 40 is provided in the automobile 1.

As described, the simulated space data providing system 40 of this embodiment may generate the surrounding space around the automobile 1 with the automobile 1 assuming the post-control position and the post-control posture, on the basis of the motion, the posture, and the position of the automobile 1 estimated by the estimation processor 21 on the basis of the control data to be outputted by the control apparatus 10.

Moreover, in this embodiment, the simulated space data providing system 40 may further arrange objects present in the surrounding space or moving objects in the surrounding space, in the surrounding space in corresponding relation to the post-control position and the post-control posture of the automobile 1.

In this embodiment, the simulated space data providing system 40 may generate the surrounding image signal regarding the surrounding space after the arrangement. The surrounding image signal is as suppliable to the control apparatus 10 as the captured image signal to be obtained by detection by the imaging device 2 provided in the automobile 1.

Accordingly, in this embodiment, it is possible to output the surrounding image signal by the signal generation processors 41 to 43 to the control apparatus 10 for the automobile 1, in place of the captured image signal of the imaging device 2 provided in the automobile 1. This makes it possible for the control apparatus 10 for the automobile 1 to provide autonomous driving assistance or the travel control by automated driving, with the use of the surrounding image signal to be supplied in place of the captured image signal of the imaging device 2, in a similar state to the case where the simulated space data providing system 40 is provided in the automobile 1.

In this embodiment, the signal generation processors 41 to 43 may acquire the data regarding the surrounding space from the space generation processor 22, generate the two-dimensional surrounding image from the surrounding space acquired, and perform the distortion processing on the surrounding image on the basis of the characteristic of the optical system of the imaging device 2.

In another example, the signal generation processors 41 to 43 or the space generation processor 22 may display the surrounding space or the surrounding image on, for example, a monitor. In this case, the signal generation processors 41 to 43 may capture the surrounding space or the surrounding image displayed on the monitor by a camera, and output a capture of the surrounding space or the surrounding image to the object estimation device 3 of the control apparatus 10 for the automobile 1. The camera may be the same as the imaging device 2, or alternatively, the camera may be different from the imaging device 2.

In such a modification example, in, for example, step ST16, the signal generation processors 41 to 43 may perform image processing of adding the distortion by the characteristic of the optical system of the imaging device 2, while performing image processing of suppressing distortion of the space or the image by the monitor and the camera. Thus, the signal generation processors 41 to 43 may generate the surrounding image to be outputted to the object estimation device 3. In this case, the memory 32 may hold characteristic data to be used in each processing, or alternatively, the memory 32 may hold data regarding residual characteristic of the optical system. The data regarding the residual characteristic of the optical system may be obtained by removing the distortion of the space or the image by the monitor and the camera from the distortion by the characteristic of the optical system of the imaging device 2. In the case with the data regarding the residual characteristic of the optical system, it is possible to perform both processing as a single process.

In this modification example, as with this embodiment, the signal generation processors 41 to 43 may process the captured image that captures the surrounding space in the corresponding relation to the post-control position and the post-control posture of the automobile 1. Thus, the signal generation processors 41 to 43 may incorporate, into the captured image, the distortion by the characteristic of the optical system of the imaging device 2. In this way, the signal generation processor 41 to 43 may generate the generated signal suppliable to the object estimation device 3 of the control apparatus 10.

Third Embodiment

Description is given next of a third embodiment of the disclosure. The surrounding space data providing system described in this embodiment is a system that provides the control apparatus 10 for the automobile 1 that is traveling, with space data in real-time.

A real-time space data providing system 60 of this embodiment is suitably used to provide useful data for the travel control of the automobile 1 that is actually traveling in the real space.

In this embodiment, similar configurations to the forgoing embodiments are denoted by the same reference characters, and the illustration and description thereof are omitted. In the following description, differences from the forgoing embodiments are mainly described.

Figure 8:
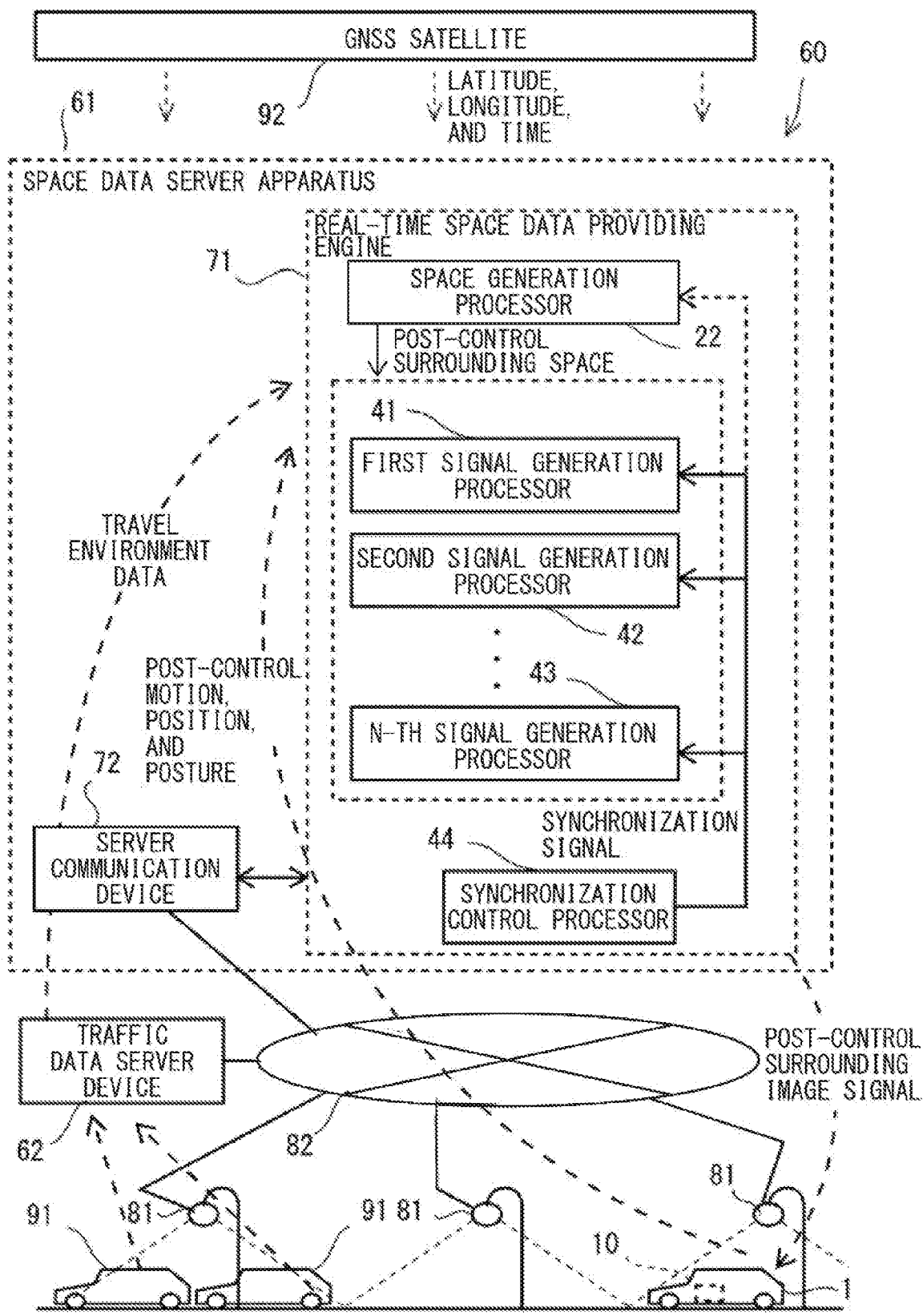
FIG. 8 is an explanatory diagram of a real-time space data providing system that serves as a surrounding space data providing system according to a third embodiment of the disclosure.

FIG. 8 is an explanatory diagram of the real-time space data providing system 60 as the surrounding space data providing system according to the third embodiment of the disclosure.

The real-time space data providing system 60 may include, without limitation, a space data server apparatus 61 and a traffic data server device 62. The space data server apparatus 61 and the traffic data server device 62 may be coupled to a communication network 82. The communication network 82 may be, for example, the Internet or a dedicated communication network. The space data server apparatus 61 and the traffic data server device 62 may each be distributed among a plurality of devices.

FIG. 8 also illustrates the automobile 1, the control apparatus 10 for the automobile 1, and a plurality of surrounding automobiles 91 traveling around the automobile 1. The automobile 1 is configured to communicate with the space data server apparatus 61 of the real-time space data providing system 60.

The automobile 1 may communicate with the plurality of the surrounding automobiles 91 and the real-time space data providing system 60. The automobile 1 may communicate with a plurality of the base stations 81 disposed along a road to establish a radio communication path. The plurality of the base stations 81 may be coupled to the communication network 82. The base stations 81 may be those for a mobile communication network, or alternatively, the base stations 81 may be those for a communication network that transmits road traffic data. The space data server apparatus 61, the traffic data server device 62, or both that are distributed in the plurality of the devices may be provided distributively in the plurality of the base stations 81.

Thus, while communicating with the plurality of the surrounding automobiles 91 and the real-time space data providing system 60, the automobile 1 may generate, for example, their respective current positions and current time, on the basis of radio waves received from, for example, a GNSS satellite 92. The automobile 1 may transmit the data thus generated, to the space data server apparatus 61 through the radio communication path.

Moreover, while communicating with the real-time space data providing system 60, the automobile 1 may transmit, to the traffic data server device 62, the data regarding the post-control motion, the post-control position, and the post-control posture of the automobile 1 detected by the autonomous sensors such as the imaging devices 2 of the automobile 1.

In the real-time space data providing system 60, the traffic data server device 62 may collect, for example, positional data from the automobile 1 and the plurality of the surrounding automobiles 91 traveling on the road, through the plurality of the base stations 81. The traffic data server device 62 may collect, for example, images of unillustrated cameras provided on the road. The traffic data server device 62 may use the collected data to generate traffic data regarding the automobile 1 and the plurality of the surrounding automobiles 91 on the road. The traffic data server device 62 may map the automobile 1 and the plurality of the surrounding automobiles 91 included in the traffic data onto a road map at their respective positions, and generate courses or travelable ranges of the automobile 1 and the plurality of the surrounding automobiles 91 in accordance with the mapping. The traffic data server device 62 may transmit the generated data to the automobile 1 and the plurality of the surrounding automobiles 91 traveling on the road, through the plurality of the base stations 81. The automobile 1 and the plurality of the surrounding automobiles 91 traveling on the road may obtain the traffic data regarding their surroundings, and data regarding their preferable courses or travelable ranges from the traffic data server device 62, for utilization in their travel control.

The space data server apparatus 61 may include, without limitation, a server communication device 72 and a real-time space data providing engine 71. The real-time space data providing engine 71 may include, without limitation, the space generation processor 22, the plurality of the signal generation processors, e.g., the first signal generation processor 41 to the n-th signal generation processor 43, and the synchronization control processor 44.

The server communication device 72 may acquire, for example, the traffic data regarding the automobile 1 and the plurality of the surrounding automobiles 91 on the road, and data obtained by mapping the automobile 1 and the plurality of the surrounding automobiles 91 onto the road map, from the traffic data server device 62.

The plurality of the signal generation processors 41 to 43 and the synchronization control processor 44 illustrated in FIG. 8 may be embodied in the plurality of the computer devices 30.

Figure 9:
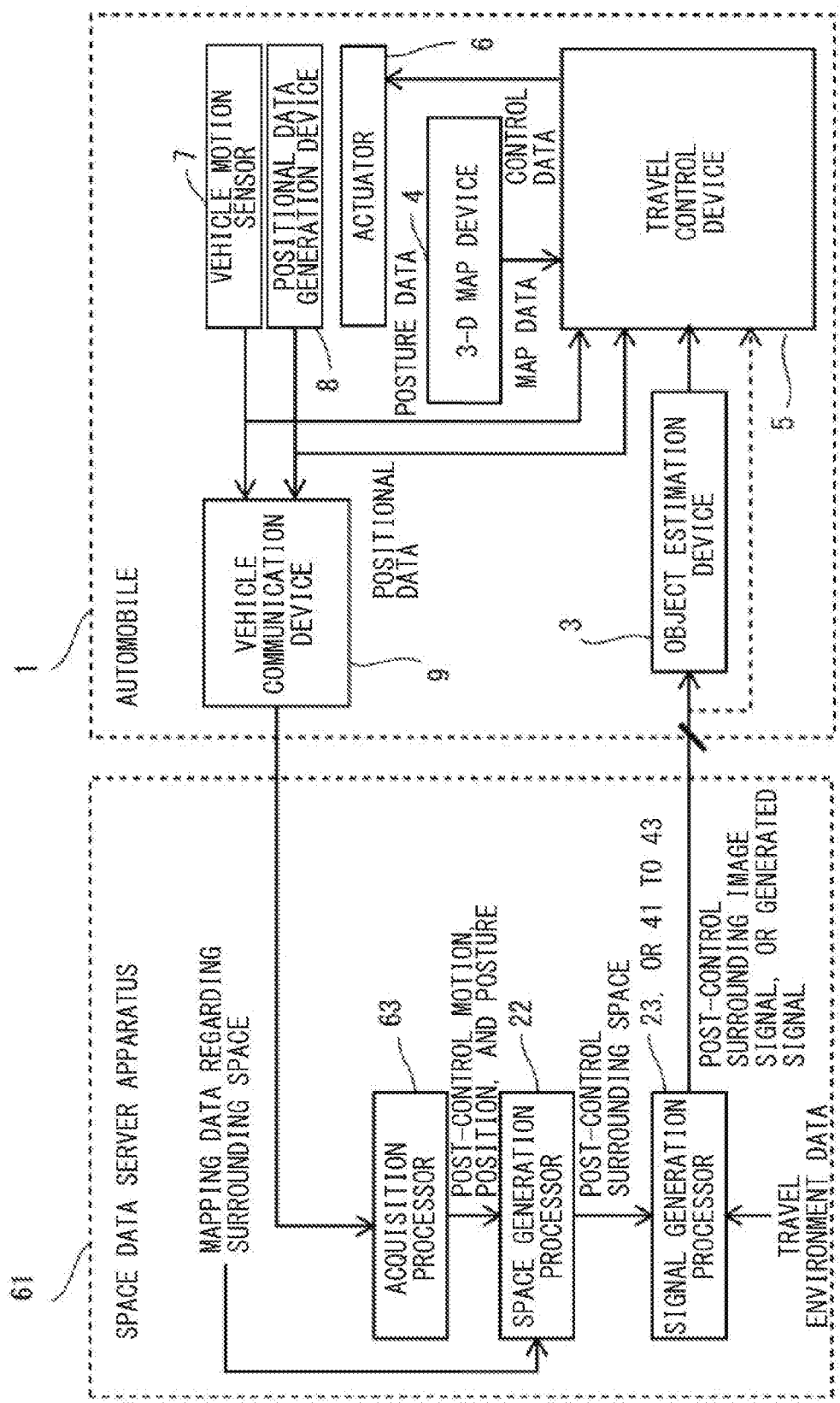
FIG. 9 is an explanatory diagram of a space data server apparatus illustrated in FIG. 8.

FIG. 9 is an explanatory diagram of the space data server apparatus 61 in FIG. 8.

FIG. 9 also illustrates the control apparatus 10 for the automobile 1. The control apparatus 10 for the automobile 1 may transmit and receive data to and from the space data server apparatus 61.

The space data server apparatus 61 in FIG. 9 may provide the control apparatus 10 for the automobile 1 configured to provide autonomous driving assistance or the travel control by automated driving, with space data regarding the real space in which the automobile 1 is actually traveling. Here, the space data may include the surrounding image.

The space data server apparatus 61 in FIG. 9 may include, without limitation, an acquisition processor 63, the space generation processor 22, and the signal generation processor 23, or the signal generation processors 41 to 43.

In this embodiment, the control apparatus 10 for the automobile 1 may be provided in the automobile 1.

That is, for example, as with FIG. 1, the plurality of the imaging devices 2 provided in the automobile 1, the actuator 6, the vehicle motion sensor 7, the positional data generation device 8, and the vehicle communication device 9 may be coupled to the control apparatus 10 for the automobile 1. The actuator 6 may actually control the travel of the automobile 1 on the basis of the control data to be generated by the travel control device 5. The vehicle motion sensor 7 may detect the post-control motion of the automobile 1. The positional data generation device 8 may generate the post-control position of the automobile 1. The vehicle communication device 9 is configured to transmit and receive communication data from and to, for example, the space data server apparatus 61 of the real-time space data providing system 60. The vehicle communication device 9 may transmit, for example, data regarding an actual motion of the automobile 1 by the vehicle motion sensor 7 and data regarding an actual position of the automobile 1 by the positional data generation system 8, to the space data server apparatus 61.

In the space data server apparatus 61 in FIG. 9, the acquisition processor 63 may include, for example, the server communication device 72. The server communication device 72 may communicate with the vehicle communication device 9 provided in the automobile 1. The server communication device 72, as the acquisition processor 63, may acquire, from the automobile 1 actually traveling in the real space, the data regarding the actual motion that is occurring in the automobile 1, and the data regarding the actual position of the automobile 1, as the data regarding the post-control motion, the post-control position, and the post-control posture.

The space generation processor 22 may acquire the data regarding the post-control motion, the post-control position, and the post-control posture of the automobile 1 acquired by the acquisition processor 63.

The space generation processor 22 may generate the surrounding space around the automobile 1 with the automobile 1 assuming the post-control position and the post-control posture, on the basis of the post-control motion, the post-control position, and the post-control posture of the automobile 1 acquired by the acquisition processor 63.

For example, the server communication device 72 may acquire the traffic data regarding the automobile 1 and the plurality of the surrounding automobiles 91 on the road and the data obtained by mapping the automobile 1 and the plurality of the surrounding automobiles 91 onto the road map, from the traffic data server device 62. In this case, the space generation processor 22 may generate the surrounding space around the automobile 1 corresponding to the road map onto which the automobile 1 and the plurality of the surrounding automobiles 91 are mapped. Here, the position, the motion, and the posture of the own vehicle in the surrounding space may be replaced with the position, the motion, and the posture of the own vehicle acquired by the acquisition processor 63, instead of those in the mapping data from the traffic data server device 62.

Here, the surrounding space around the automobile 1 may be a mapping space corresponding to the real space to be traveled actually by the automobile 1, or a mixed space of the mapping space and the real space.

Moreover, the surrounding space around the automobile 1 may be a two-dimensional space or a three-dimensional space. The two-dimensional space may two-dimensionally include solely a road surface on which the automobile 1 travels. The three-dimensional space may include travel environment of the automobile 1 including three-dimensional objects such as buildings. In the three-dimensional surrounding space, the road surface on which the automobile 1 travels may be included three-dimensionally so that the road surface has unevenness.

The signal generation processor 23 may acquire the data regarding the post-control surrounding space around the automobile 1 generated by the space generation processor 22.

The signal generation processor 23 may further acquire the data regarding the post-control motion, the post-control position, and the post-control posture of the automobile 1 acquired by the acquisition processor 63.

The signal generation processor 23 may generate the two-dimensional surrounding image, as the surrounding space around the automobile 1 is viewed with the viewpoint position set at the imaging device 2 provided in the post-control automobile 1. The surrounding image may conform to the imaging range, or the angle of view, of the imaging device 2 provided in the automobile 1.

Moreover, as in the forgoing embodiments, the signal generation processor 23 may perform the distortion processing on the surrounding image.

The signal generation processor 23 may output the surrounding image signal including the generated surrounding image, to the object estimation device 3 of the control apparatus 10. The surrounding image signal may be the same as the captured image signal the imaging device 2 provided in the automobile 1 outputs to the object estimation device 3 of the control apparatus 10. The surrounding image signal may have the same signal format as that of the captured image signal and the same form of the waveform components other than the waveform component based on the image included in the signal.

As described, the object estimation device 3 of the control apparatus 10 for the automobile 1 is configured to acquire, in real time, the surrounding image similar to the captured image detectable in the post-control automobile 1, from the space data server apparatus 61.

The object estimation device 3 is configured to perform the processing appropriately with the use of the surrounding image in place of the captured image, for example, in the following cases: where the normal captured image is not available from the imaging device 2; where the captured image is not a clear image because of influences of, for example, weather; or on night-time travel with lights such as headlights off.

As described, the real-time space data providing system 60 of this embodiment may generate the surrounding space around the automobile 1 with the automobile 1 assuming the post-control position and the post-control posture, on the basis of the actual motion of the automobile 1 based on the control data to be outputted by the control apparatus 10 for the automobile 1.

Moreover, the surrounding space in the corresponding relation to the post-control position and the post-control posture of the automobile 1 may include other moving objects such as the surrounding automobiles 91 present around the automobile 1 in the real space.

In this embodiment, it is possible to generate the surrounding image of such a surrounding space similar to the captured image, in place of the captured image to be obtained by the detection by the imaging device 2 provided in the automobile 1.

Hence, in this embodiment, it is possible for the control apparatus 10 for the automobile 1 configured to provide autonomous driving assistance or the travel control by automated driving with the use of the captured image signal of the imaging device 2 to provide autonomous driving assistance or the travel control by automated driving with the use of the surrounding image in place of the captured image of the imaging device 2. It is possible for the control apparatus 10 to keep on providing autonomous driving assistance or the travel control by automated driving as ever, even in a case with an abnormality of the imaging device 2 or even in the weather that inhibits the imaging device 2 from having a sufficient field of view.

Fourth Embodiment

Description is given next of a surrounding space data providing system according to a fourth embodiment of the disclosure. In this embodiment, some configuration examples are described by giving an example of the simulated space data providing system, out of the simulated space data providing system and the real-time space data providing system as mentioned above.

In this embodiment, similar configurations to the forgoing embodiments are denoted by the same reference characters, and the illustration and description thereof are omitted. In the following description, differences from the forgoing embodiments are mainly described.

Figure 10:
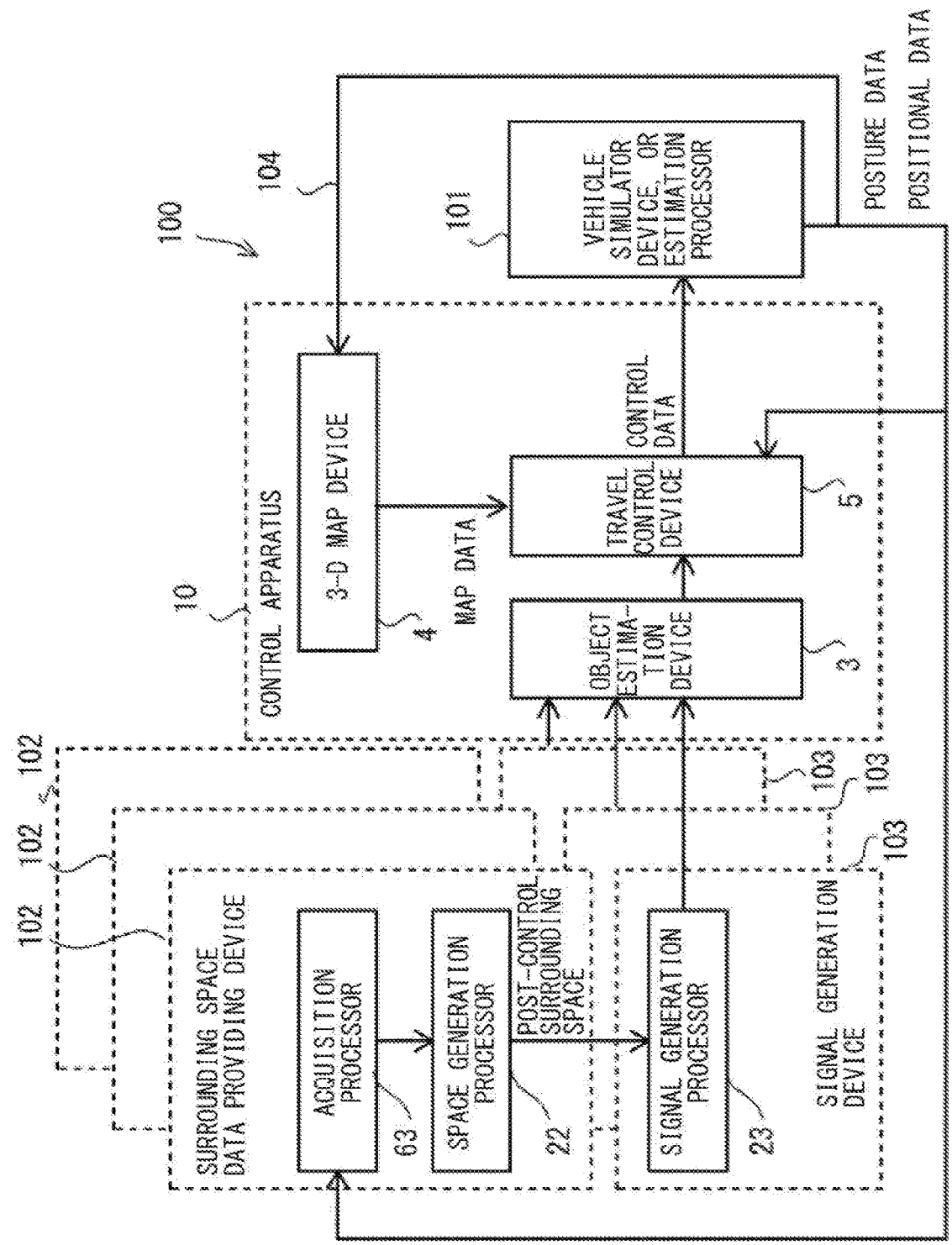
FIG. 10 is an explanatory diagram of a simulated space data providing system that serves as a surrounding space data providing system according to a fourth embodiment of the disclosure.

FIG. 10 is an explanatory diagram of a simulated space data providing system 100 as the surrounding space data providing system according to the fourth embodiment of the disclosure.

The simulated space data providing system 100 of this embodiment may include, without limitation, a vehicle simulator device 101, a plurality of surrounding space data providing devices 102, a plurality of signal generation devices 103, and a signal line 104.

The vehicle simulator device 101 may include the computer device 30. The computer device 30 may be coupled to the travel control device 5 of the control apparatus 10 for the automobile 1 and supplied with the control data from the travel control device 5. On the basis of the control data, the CPU 33 of the vehicle simulator device 101 may generate the data regarding the post-control position and the post-control posture of the automobile 1. The CPU 33 of the vehicle simulator device 101 may hold data regarding the scenario of the travel in a movement space in the simulation of the automobile 1. On the basis of the data regarding the scenario of the travel, the CPU 33 of the vehicle simulator device 101 may generate the data regarding the post-control position and the post-control posture of the automobile 1. The CPU 33 of the vehicle simulator device 101 may output the generated data regarding the post-control position and the post-control posture of the automobile 1, to the travel control device 5 and the three-dimensional map device 4 of the control apparatus 10 for the automobile 1, and to the plurality of the surrounding space data providing devices 102.

Moreover, the CPU 33 of the vehicle simulator device 101 may output, to the travel control device 5 and the three-dimensional map device 4 of the control apparatus 10 for the automobile 1, data that allows the travel control device 5 of the control apparatus 10 for the automobile 1 to make the travel control in the movement space in accordance with the scenario of the travel. For example, the CPU 33 of the vehicle simulator device 101 may generate a travel course in accordance with the scenario of the travel on the basis of the post-control motion, the post-control position, and the post-control posture of the automobile 1. The CPU 33 of the vehicle simulator device 101 may output the course to the control apparatus 10 for the automobile 1. The CPU 33 of the vehicle simulator device 101 may generate operation data in the automobile 1, and output the operation data to the control apparatus 10. The operation data is provided for allowing the automobile 1 to travel along the course generated.

The plurality of the surrounding space data providing devices 102 may include the same number of the computer devices 30 as the number of inputs of the captured image signals of the plurality of the captured images to the object estimation device 3 of the control apparatus 10 for the automobile 1.

The surrounding space data providing device 102 may include, without limitation, the acquisition processor 63 and the space generation processor 22 as mentioned above. The acquisition processor 63 may acquire the data regarding the post-control position and the post-control posture of the automobile 1 from the vehicle simulator device 101. The space generation processor 22 may generate the post-control surrounding space on the basis of the acquired data regarding the post-control position and the post-control posture of the automobile 1.

As with the surrounding space data providing devices 102, the plurality of the signal generation devices 103 may include the same number of the computer devices 30 as the number of the inputs of the captured image signals of the plurality of the captured images to the object estimation device 3 of the control apparatus 10 for the automobile 1. In this case, the plurality of the signal generation devices 103 and the plurality of the surrounding space data providing devices 102 may be in one-to-one corresponding relation.

The signal generation device 103 may include the signal generation processor 23 as mentioned above. The signal generation processor 23 may acquire the data regarding the post-control surrounding space from a corresponding one of the surrounding space data providing devices 102, and generate the surrounding image that captures the surrounding space. Moreover, the signal generation processor 23 may perform the distortion processing on the surrounding image, as in the embodiments described above.

Furthermore, prior to the generation of the surrounding image, the signal generation processor 23 may arrange moving objects in the acquired surrounding space around the automobile 1. Non-limiting examples of the moving objects may include surrounding automobiles moving around the automobile 1. The signal generation processor 23 may acquire the data regarding the moving objects such as the surrounding automobiles on the basis of, for example, the scenario of the vehicle simulator device 101, and allow the moving objects to move in the surrounding space around the automobile 1. In this case, the signal generation processor 23 may generate the surrounding image including, for example, the surrounding automobiles that are moving.

The signal generation processor 23 may output the surrounding image signal including the generated surrounding image to the object estimation device 3 of the control apparatus 10.

The signal line 104 may couple together the vehicle simulator device 101, the travel control device 5 and the three-dimensional map device 4 of the control apparatus 10 for the automobile 1, and the plurality of the surrounding space data providing devices 102. It suffices that the signal line 104 couples together the plurality of the computing devices 30. The signal line 104 may include, without limitation, a communication cable in conformity to, for example, IEEE (Institute of Electrical and Electronics Engineers) 802.3.

In the simulated space data providing system 100 of such a configuration, each processing for simulation may be carried out distributively by the plurality of the computer devices 30. The computer devices 30 may include computer devices having performance corresponding to respective loads on them.

The signal line 104 may be basically provided solely for transmission and reception of the data regarding the post-control position and the post-control posture of the automobile 1. This leads to minimization of delays in signal transmission between the computer devices 30. In particular, the data to be transmitted and received may include the data regarding the post-control position and the post-control posture of the automobile 1, making it possible to use the common signal for the control apparatus 10 for the automobile 1. This saves the vehicle simulator device 101 from generating separately the data for the control apparatus 10 for the automobile 1 and the data for the simulation, leading to effective reduction in a processing load.

In this embodiment, the plurality of the surrounding space data providing devices 102 and the plurality of the signal generation devices 103 of the simulated space data providing system 100 may each include their respective computer devices 30 separate from each other.

In an alternative example, each combination of the surrounding space data providing device 102 and the signal generation device 103 of the simulated space data providing system 100 may include the single computer device 30.

In another alternative, the surrounding space data providing devices 102 may include the single computer device 30, while the signal generation devices 103 may include the plurality of the computer devices 30.

In such cases as well, taking synchronization between the plurality of the signal generation devices 103 including the plurality of the computer devices 30 makes it possible to produce similar effects to those of this embodiment.

Figure 11:
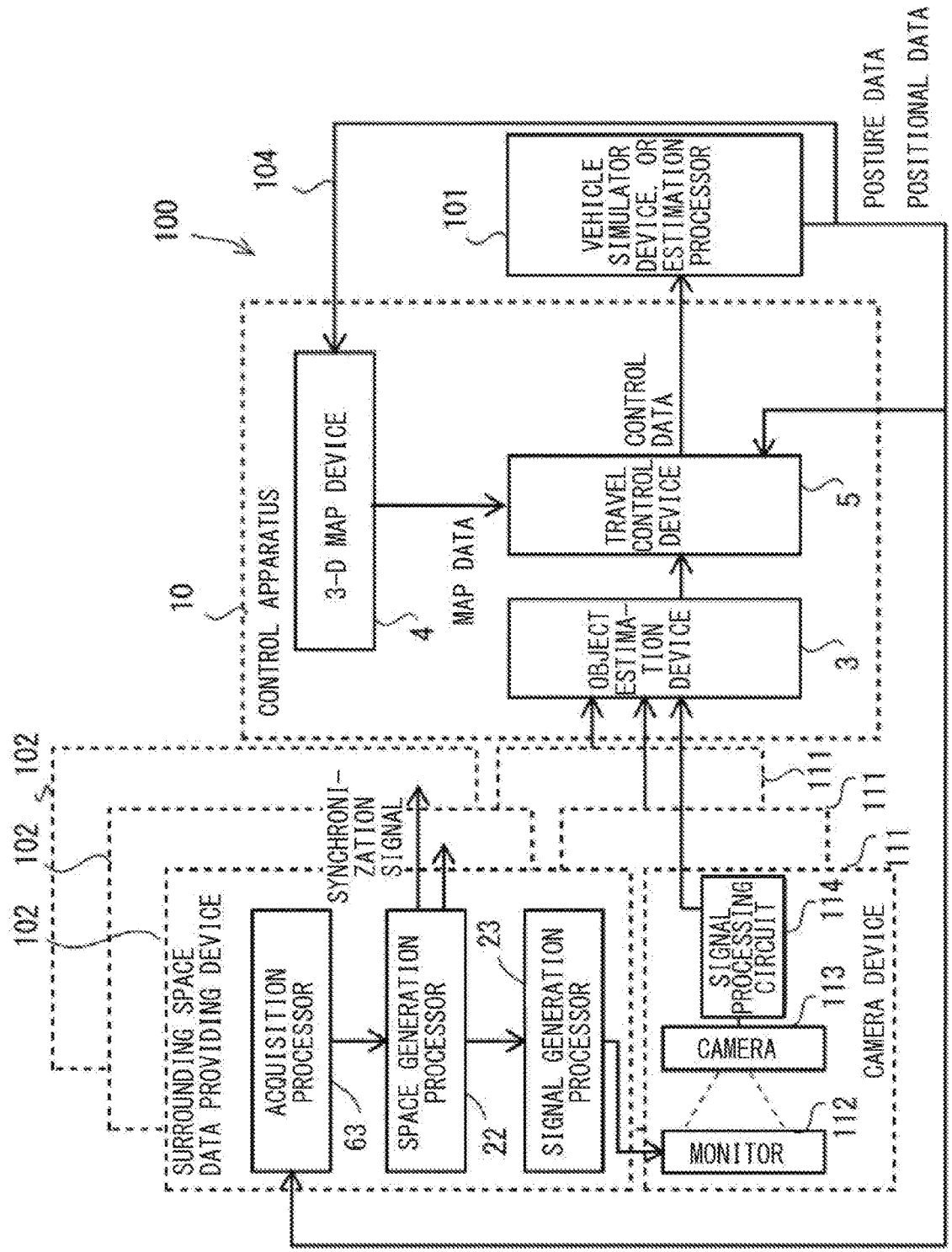
FIG. 11 is an explanatory diagram of a simulated space data providing system according to a modification example of the fourth embodiment.

FIG. 11 is an explanatory view of the simulated space data providing system 100 according to a modification example of the fourth embodiment.

The simulated space data providing system 100 in FIG. 11 may include, without limitation, the vehicle simulator device 101, the plurality of the surrounding space data providing devices 102, a plurality of camera devices 111, and the signal line 104.

The plurality of the surrounding space data providing devices 102 may include, without limitation, the acquisition processor 63, the space generation processor 22, and the signal generation processor 23 as mentioned above. The acquisition processor 63 may acquire the data regarding the post-control position and the post-control posture of the automobile 1 from the vehicle simulator device 101. On the basis of the acquired data regarding the post-control position and the post-control posture of the automobile 1, the space generation processor 22 may generate the post-control surrounding space. The signal generation processor 23 may output the surrounding image signal including the surrounding image generated.

Moreover, one of the space generation processors 22 of the plurality of the surrounding space data providing devices 102, as a master unit, may output the synchronization signal to the reminder of the space generation processors 22 of the surrounding space data providing devices 102.

As with the surrounding space data providing devices 102, the plurality of the camera devices 111 may include the same number of the computer devices 30 as the number of the inputs of the captured image signals of the plurality of the captured images to the object estimation device 3 of the control apparatus 10 for the automobile 1. In this case, the plurality of the signal generation devices 103 and the plurality of the camera devices 111 may be in one-to-one corresponding relation.

The camera device 111 may include, without limitation, a monitor 112, a camera 113, and a signal processing circuit 114.

The monitor 112 may be supplied with the captured image signal of the surrounding space data providing device 102. The monitor 112 may display the surrounding image included in the surrounding image signal.

The camera 113 may be disposed to be opposed to a display surface of the monitor 112. The camera 113 may capture the surrounding image displayed on the monitor 112.

The signal processing circuit 114 may be coupled to the camera 113. The signal processing circuit 114 may process the surrounding image captured by the camera 113, to generate and output the surrounding image signal.

Thus, the camera device 111 may actually display and capture the surrounding image included in the surrounding image signal generated by the surrounding space data providing device 102, to reproduce the surrounding image signal.

The object estimation device 3 of the control apparatus 10 for the automobile 1 of this modification example may be supplied with the plurality of the surrounding image signals reproduced by the plurality of the camera devices 111, instead of the surrounding image signals generated by the signal generation processors 23 of the plurality of the surrounding space data providing devices 102.

Simulation environment of the object estimation device 3 of the control apparatus 10 may represent environment in which the object estimation device 3 of the control apparatus 10 is actually mounted on the automobile 1.

The object estimation device 3 of the control apparatus 10 is configured to carry out simulation testing in environment that includes processing time of the camera 113 and the signal processing circuit 114.

The object estimation device 3 of the control apparatus 10 is configured to carry out the simulation testing, while providing representation of substantially similar environment in which the object estimation device 3 of the control apparatus 10 is mounted on the automobile 1.

In this modification example, the object estimation device 3 of the control apparatus 10 may be supplied with the plurality of the surrounding image signals reproduced by the plurality of the camera devices 111, instead of the surrounding image signals generated by the signal generation processors 23 of the plurality of the surrounding space data providing devices 102.

This saves the plurality of the signal generation processors 23 from performing the distortion processing on the surrounding images including characteristics of optical systems of the monitor 112 and the camera 113 of the camera device 111. The distortion processing is provided for elimination of image distortion caused by the monitor 112 and the camera 113 of the camera device 111 from the surrounding image of the surrounding image signal to be reproduced.

In this case, for example, in step ST16 of the output control of the surrounding image signal in FIG. 6, the signal generation processors 41 to 43 may perform the image processing of adding the distortion caused by the characteristic of the optical system of the imaging device 2. The signal generation processors 41 to 43 may further perform image processing of suppressing the distortion of the space or the image that occurs when the image is displayed on the monitor 112 of the camera device 111, and image processing of suppressing the distortion of the space or the image that occurs in the optical system of the camera 113. In this case, the memory 32 may hold data regarding an optical characteristic to be used in each processing.

Moreover, the memory 32 may hold data regarding an optical characteristic obtained by subtracting the distortion that occurs when the image is displayed on the monitor 112 of the camera device 111, and the distortion that occurs in the optical system of the camera 113, from the distortion caused by the characteristic of the optical system of the imaging device 2. In this case, the CPU 33 may perform the three kinds of the distortion processing as mentioned above by the single distortion processing using the data regarding the optical characteristic read out from the memory 32.

In this modification example, as with this embodiment, the signal generation processors 41 to 43 may process the captured image that captures the surrounding space in the corresponding relation to the post-control position and the post-control posture of the automobile 1. Thus, the signal generation processors 41 to 43 may incorporate, into the captured image, the distortion caused by the characteristic of the optical system of the imaging device 2. This allows the object estimation device 3 of the control apparatus 10 to be supplied basically with the surrounding image signal of the surrounding image including the distortion caused by the characteristic of the optical system of the imaging device 2.

It is to be noted that a sum of the distortion that occurs when the image is displayed on the monitor 112 of the camera device 111 and the distortion that occurs in the optical system of the camera 113 becomes equivalent to the distortion caused by the characteristic of the optical system of the imaging device 2, resulting in possibility that they are considered to match. In this case, or in a case where considering them matching does not cause considerable inconvenience, supplying the surrounding image signal to the camera device 111 to allow the camera device 111 to reproduce the surrounding image signal makes it possible to incorporate the distortion caused by the characteristic of the optical system of the imaging device 2 into the surrounding image of the surrounding image signal to be reproduced. In one alternative, the process of step ST16 by the signal generation processors 41 to 43 may be eliminated.

Although some example embodiments of the technology have been described in the forgoing by way of example with reference to the accompanying drawings, the technology is by no means limited to the example embodiments described above. It should be appreciated that modifications and alterations may be made by persons skilled in the art without departing from the scope as defined by the appended claims.

In the forgoing example embodiments, the control apparatus 10 for the automobile 1 may be supplied with the captured image signal of the imaging device 2 provided in the automobile 1. The control apparatus 10 for the automobile 1 may make a predetermined control with the use of the surrounding image signal to be supplied in place of the captured image signal.

The automobile 1 may include not only the imaging device 2 but also, for example, radar for the surroundings, a proximity sensor, and other autonomous sensors of various kinds. Detection signals of these autonomous sensors may be inputted to the control apparatus 10 for the automobile 1. The surrounding space data providing system 20, the simulated space data providing system 40, or the real-time space data providing system 60 may generate a signal that simulates the detection signals of these autonomous sensors, and supply the generated signal to the control apparatus 10 for the automobile 1.

In the forgoing embodiments, the space generation processor may generate the post-control surrounding space. The signal generation processor may generate the surrounding image of the surrounding space thus generated, and the surrounding image signal including the surrounding image.

In another example, the space generation processor may generate the post-control surrounding space and the surrounding image for the surrounding space. The signal generation processor may generate the surrounding image signal including the surrounding image generated.

The surrounding space data providing system 20, the simulated space data providing system 40, the real-time space data providing system 60, the simulated space data providing system 100, and each element thereof s2, 4, 8, 10 and 11 are each of the surrounding space data providing systems 20, the simulated space data providing system 40, the real-time space data providing system 60, and the simulated space data providing system 100 illustrated in FIGS. 2, 4, 8, 10, and 11 each of the surrounding space data providing systems 20, the simulated space data providing system 40, the real-time space data providing system 60, and the simulated space data providing system 100s2, 4, 8, 10, and 11.

The invention claimed is:

1. A surrounding space data providing system for a real vehicle having a control apparatus and an autonomous sensor,
wherein the control apparatus of the real vehicle is configured to receive a detection signal from the autonomous sensor of the real vehicle, and based on the detection signal, perform an autonomous driving assistance function, an autonomous driving function, or both, wherein the surrounding space data providing system is configured to be coupled to the control apparatus to receive control data from the control apparatus, the control data being generated for performing the autonomous driving assistance function, the autonomous driving function, or both, wherein the surrounding space data providing system comprises:

a space generation processor configured to:

estimate a movement of the real vehicle based on the control data from the control apparatus; and generate a virtual surrounding space of the real vehicle corresponding to a position and posture of the real vehicle after the estimated movement; and a signal generation processor configured to:

generate a simulated detection signal that simulates the detection signal from the autonomous sensor when detecting objects, moving objects, or both; and output the simulated detection signal to the control apparatus in substitution for the detection signal from the autonomous sensor, so that the control apparatus performs control as if the real vehicle were actually moving based on actual sensor input, and wherein the simulated detection signal includes a surrounding image of the virtual surrounding space as viewed from a viewpoint position set at the autonomous sensor provided in the real vehicle, after an estimated movement of the real vehicle.

2. The surrounding space data providing system for the control apparatus for the vehicle according to claim 1, wherein the autonomous sensor is a real sensor provided in the real vehicle together with the control apparatus, and the signal generation processor is configured to perform virtual signal processing based on a characteristic of the autonomous sensor, to generate the simulated detection signal to be supplied to the control apparatus.

3. The surrounding space data providing system for the control apparatus for the vehicle according to claim 2, wherein the autonomous sensor provided in the real vehicle together with the control apparatus comprises a real imaging device, the real imaging device being configured to capture a real surrounding space around the real vehicle, to output a captured image signal as the detection signal to the control apparatus, and the signal generation processor is configured to:

simulate the real imaging device;

generate, based on the position and posture of the real vehicle after the estimated movement, a simulated image corresponding to an image that would be captured by the real imaging device in the virtual surrounding space;

perform virtual image processing on the simulated image including incorporating distortion based on a characteristic of an optical system of the real imaging device; and output the simulated detection signal corresponding to the simulated image to the control apparatus.

4. The surrounding space data providing system for the control apparatus for the vehicle according to claim 1, wherein the control apparatus of the real vehicle is configured to receive h a plurality of detection signals from a plurality of autonomous sensors, including the autonomous sensor, provided in the real vehicle, the surrounding space data providing system includes a plurality of signal generation processors, including the signal generation processor, corresponding to the respective autonomous sensors, and the plurality of signal generation processors is configured to generate, based on the control data, a plurality of simulated detection signals that simulate the respective detection signals from the plurality of autonomous sensors, and to output the plurality of simulated detection signals to the control apparatus in substitution for the plurality of detection signals from the autonomous sensors.

5. The surrounding space data providing system for the control apparatus for the vehicle according to claim 2, wherein the control apparatus of the real vehicle is configured to receive h a plurality of detection signals from a plurality of autonomous sensors, including the autonomous sensor, provided in the real vehicle, the surrounding space data providing system includes a plurality of signal generation processors, including the signal generation processor, corresponding to the respective autonomous sensors, and the plurality of signal generation processors is configured to generate, based on the control data, a plurality of simulated detection signals that simulate the respective detection signals from the plurality of autonomous sensors, and to output the plurality of simulated detection signals to the control apparatus in substitution for the plurality of detection signals from the autonomous sensors.

6. The surrounding space data providing system for the control apparatus for the vehicle according to claim 3, wherein the control apparatus of the real vehicle is configured to receive h a plurality of detection signals from a plurality of autonomous sensors, including the autonomous sensor, provided in the real vehicle, the surrounding space data providing system includes a plurality of signal generation processors, including the signal generation processor, corresponding to the respective autonomous sensors, and the plurality of signal generation processors is configured to generate, based on the control data, a plurality of simulated detection signals that simulate the respective detection signals from the plurality of autonomous sensors, and to output the plurality of simulated detection signals to the control apparatus in substitution for the plurality of detection signals from the autonomous sensors.

7. The surrounding space data providing system for the control apparatus for the vehicle according to claim 4, further comprising a synchronization control processor configured to output a synchronization signal to at least the plurality of signal generation processors, wherein the synchronization control processor is configured to output the synchronization signal on cycles equal to or shorter than control cycles of the control apparatus for the real vehicle, and the plurality of signal generation processors is configured to update the plurality of simulated detection signals on a basis of the synchronization signal supplied in common to the plurality of signal generation processors; and synchronize simulated detection signals with one another on the control cycles of the control apparatus or shorter.

8. The surrounding space data providing system for the control apparatus for the vehicle according to claim 5, further comprising a synchronization control processor configured to output a synchronization signal to at least the plurality of signal generation processors, wherein the synchronization control processor is configured to output the synchronization signal on cycles equal to or shorter than control cycles of the control apparatus for the real vehicle, and the plurality of signal generation processors is configured to update the plurality of simulated detection signals on a basis of the synchronization signal supplied in common to the plurality of signal generation processors; and synchronize the simulated detection signals with one another on the control cycles of the control apparatus or shorter.

9. The surrounding space data providing system for the control apparatus for the vehicle according to claim 6, further comprising a synchronization control processor configured to output a synchronization signal to at least the plurality of signal generation processors, wherein the synchronization control processor is configured to output the synchronization signal on cycles equal to or shorter than control cycles of the control apparatus for the real vehicle, and the plurality of signal generation processors is configured to update the plurality of simulated detection signals on a basis of the synchronization signal supplied in common to the plurality of signal generation processors; and synchronize the simulated detection signals with one another on the control cycles of the control apparatus or shorter.

10. The surrounding space data providing system for the control apparatus for the vehicle according to claim 1, further comprising an estimation processor configured to estimate a motion of the real vehicle based on the control data, wherein the space generation processor is configured to:

determine the position and posture of the real vehicle after the estimated movement based on the estimated motion; and generate the virtual surrounding space in which the real vehicle is virtually assumed to exist at the determined position and posture a, and the surrounding space data providing system is configured to provide simulated space data regarding a virtual space to be traveled virtually by the real vehicle.

11. The surrounding space data providing system for the control apparatus for the vehicle according to claim 2, further comprising an estimation processor configured to estimate a motion of the real vehicle based on the control data, wherein the space generation processor is configured to:

determine the position and posture of the real vehicle after the estimated movement based on the estimated motion; and generate the virtual surrounding space in which the real vehicle is virtually assumed to exist at the determined position and posture a, and the surrounding space data providing system is configured to provide simulated space data regarding a virtual space to be traveled virtually by the real vehicle.

12. The surrounding space data providing system for the control apparatus for the vehicle according to claim 3, further comprising an estimation processor configured to estimate a motion of the real vehicle based on the control data, wherein the space generation processor is configured to:

determine the position and posture of the real vehicle after the estimated movement based on the estimated motion; and generate the virtual surrounding space in which the real vehicle is virtually assumed to exist at the determined position and posture a, and the surrounding space data providing system is configured to provide simulated space data regarding a virtual space to be traveled virtually by the real vehicle.

13. The surrounding space data providing system for the control apparatus for the vehicle according to claim 1, further comprising an acquisition processor configured to acquire, from the real vehicle that is actually traveling in a real environment, data regarding a motion of the real vehicle, a position and posture of the real vehicle, or both, wherein the space generation processor is configured to generate a surrounding space corresponding to a real space in which the real vehicle is traveling, based on the data acquired by the acquisition processor, and the surrounding space data providing system is configured to provide real-time space data regarding the real space surrounding the vehicle.

14. The surrounding space data providing system for the control apparatus for the vehicle according to claim 2, further comprising an acquisition processor configured to acquire, from the real vehicle that is actually traveling in a real environment, data regarding a motion of the real vehicle, a position and posture of the real vehicle, or both, wherein the space generation processor is configured to generate a surrounding space corresponding to a real space in which the real vehicle is traveling, based on the data acquired by the acquisition processor, and the surrounding space data providing system is configured to provide real-time space data regarding the real space surrounding the vehicle.

15. The surrounding space data providing system for the control apparatus for the vehicle according to claim 3, further comprising an acquisition processor configured to acquire, from the real vehicle that is actually traveling in a real environment, data regarding a motion of the real vehicle, a position and posture of the real vehicle, or both, wherein the space generation processor is configured to generate a surrounding space corresponding to a real space in which the real vehicle is traveling, based on the data acquired by the acquisition processor, and the surrounding space data providing system is configured to provide real-time space data regarding the real space surrounding the vehicle.

16. A surrounding space data providing system for a real vehicle having a control apparatus and an autonomous sensor, wherein the control apparatus of the real vehicle is configured to receive a detection signal from the autonomous sensor of the real vehicle, and based on the detection signal, perform an autonomous driving assistance function, an autonomous driving function, or both, wherein the surrounding space data providing system is configured to be coupled to the control apparatus to receive control data from the control apparatus, the control data being generated for performing the autonomous driving assistance function, the autonomous driving function, or both, and wherein the surrounding space data providing system comprises circuitry configured to:

estimate a movement of the real vehicle based on the control data from the control apparatus;

generate a virtual surrounding space of the real vehicle corresponding to a position and posture of the real vehicle after the estimated movement;

generate a simulated detection signal that simulates the detection signal from the autonomous sensor when detecting objects, moving objects, or both; and output the simulated detection signal to the control apparatus in substitution for the detection signal from the autonomous sensor, so that the control apparatus performs control as if the real vehicle were actually moving based on actual sensor input, wherein the simulated detection signal includes a surrounding image of the virtual surrounding space as viewed from a viewpoint position set at the autonomous sensor provided in the real vehicle, after an estimated movement of the real vehicle.

* * * * *